United States Patent [19]

Orton

[11] Patent Number: 5,297,206
[45] Date of Patent: Mar. 22, 1994

[54] CRYPTOGRAPHIC METHOD FOR COMMUNICATION AND ELECTRONIC SIGNATURES

[76] Inventor: Glenn A. Orton, 158 Kent Street, Hamilton, Ont., Canada, L8P 3Z3

[21] Appl. No.: 957,105

[22] Filed: Oct. 7, 1992

Related U.S. Application Data

[63] Continuation-in-part of Ser. No. 854,389, Mar. 19, 1992, abandoned.

[51] Int. Cl.$^5$ .......................... H04L 9/30; H04L 9/32
[52] U.S. Cl. ................................... 380/30; 380/23; 380/28
[58] Field of Search ............... 380/30, 23-25, 380/28

[56] References Cited

U.S. PATENT DOCUMENTS

| | | | |
|---|---|---|---|
| 4,306,111 | 12/1981 | Lu et al. | 380/30 |
| 4,399,323 | 8/1983 | Henry | 380/30 |
| 4,633,036 | 12/1986 | Hellman et al. | 380/30 |
| 4,748,668 | 5/1988 | Shamir et al. | 380/30 X |
| 4,995,082 | 2/1991 | Schnorr | 380/30 X |
| 5,016,274 | 5/1991 | Micali et al. | 380/30 X |
| 5,054,066 | 10/1991 | Rick et al. | 380/30 |
| 5,073,935 | 12/1991 | Pastur | 380/30 |
| 5,097,504 | 3/1992 | Camion et al. | 380/30 X |

*Primary Examiner*—Gilberto Barron, Jr.
*Attorney, Agent, or Firm*—Richard J. Hicks

[57] ABSTRACT

A cryptographic method for communication and electronic signatures is described. The system includes at least one encoding device coupled to at least one decoding device by a communications channel. The method is a form of public-key or two-key cryptosystem, where the private decoding key is not feasibly determinable from the associated public encoding key. A block of ns bits of a message-to-be-transferred M (or key-to-be-distributed) is enciphered to ciphertext by first mapping M to a set $\{x_1, x_2, \ldots, x_n\}$, where $x_i \in [0, 2^s)$. Then the ciphertext $\{y_1, y_2, \ldots, y_m\}$ is determined by $$y_j = \sum_{i=1}^{n} x_i a_{ij} - A_x g_j$$

mod $q_j$, for $j=1$ to $m'$, and $$y_j = \sum_{i=1}^{n} x_i a_{ij} - A_x g_j,$$

for $j = m'+1$ to $m$, where $$A_x = \left[ -2^{-s-1} + \sum_{i=1}^{n} x_i f_i \right].$$

The encoding key (associated with the intended receiver) consists of integers $a_{ij}$, $g_j$, and positive fractions $f_i$, for $i=1$ to $n$ and for $j=1$ to $m$, and positive integers $q_j$, for $j=1$ to $m'$. The ciphertext is deciphered (with a secret key known only to the intended receiver) by solving a knapsack $$b = \sum_{i=1}^{n} x_i' b_i$$

with secret superincreasing weights $\{b_1, b_2, \ldots, b_n\}$ and target value $b \equiv |w^{-1}|w'^{-1}y|_Q|_P$, where $y \equiv \{y_1, y_2, \ldots, y_m\}$ mod $\{q_1, q_2, \ldots, q_m\}$, $$Q = \prod_{j=1}^{m} q_j,$$

and $w$, $w'$, and $\{q_{m'+1}, q_{m'+2}, \ldots, q_m\}$ are secret integers. The resulting terms $\{x'_1, x'_2, \ldots, x'_n\}$ correspond to the original message terms $\{x_1, x_2, \ldots, x_n\}$.

20 Claims, 7 Drawing Sheets

CRYPTOGRAPHIC METHOD FOR COMMUNICATION AND ELECTRONIC SIGNATURES

CROSS REFERENCE TO RELATED APPLICATION

This application is a continuation-in-part of my earlier filed U.S. patent application Ser. No. 07/854,389 filed Mar. 19, 1992 and now abandoned.

BACKGROUND OF THE INVENTION

1. Field of the Invention

This invention relates generally to cryptographic communication systems and, more particularly, to public-key cryptographic systems in which the use of two keys, a public and private key, facilitates both secret and authentic transmission of data. A public-key cryptosystem can be used for identification, electronic signatures, key-distribution, and secure data communication. Specific applications of a public-key cryptosystem include automated bank tellers exchanging data with customer chip-cards, point of service banking, telecommunications, electronic mail, and access control.

2. Description of the Prior Art

The two primary cryptographic functions required by modern communications systems are secrecy and authenticity. Secret transmission of data over an insecure channel is a well established cryptographic function. This data may be a message-to-be-transferred or a key-to-be-exchanged. Another cryptographic function is the authentication of electronic messages (or verification of identity by electronic means). Authentication is particularly a concern with electronic communications because of the potential for tampering and forging digital messages.

Cryptosystems can be classified into two types: private-key and public-key. Private-key cryptosystems (also referred to as single-key or symmetrical cryptosystems), such as the DES scheme (data encryption standard), use the same key for encryption and decryption. These ciphers can be fast and hard to break but a threat to their security is the distribution of the private key.

Public-key cryptography was introduced by W. Diffie and M. E. Hellman in "New directions in cryptography", IEEE Trans. Inform. Theory, vol. IT-22, 1976, pp. 644–654. Public-key, two-key, or asymmetrical cryptosystems address the problem of distributing a secret key over an insecure channel by using two keys. Each party has their own secret decoding key and a mathematically related public encoding key, which can be publicly distributed without compromising the secrecy of the associated decoding key. Secret communication employs the pair of keys belonging to the receiver and an electronic signature makes use of the pair of keys of the sender.

A message M can be enciphered by sender A, with a publicly available encoding key $E_B$ generated by party B, that can only be deciphered by receiver B with the matching private key $D_B$. For secret transmission from party A to party B, the ciphertext C is enciphered by party A as $C=E_B(M)$ and deciphered by party B as $D_B(C)=D_B(E_B(M))=M$. For authenticity, the sender A applies the decoding function to the message with his/her own private key $D_A$ and the receiver B unscrambles the message by applying the encoding function with the sender's public key $E_A$. To verify that a message M from party A is authentic, a signature $C=D_A(M)$ is generated by party A and the signature is verified by party B as $E_A(C)=E_A(D_A(M))=M$.

There are variations on the above basic Diffie and Hellman protocol such as concatenating standard data with the message, which is checked by the receiver, or signing a hashed (compressed) form of the message. To check identity, the verifier challenges the candidate to sign a random number (which is checked with the public key of the candidate) or to decrypt an enciphered random number. There are some public-key schemes that can only be used for signatures or secret transmission of data (but not both), while other schemes can provide both secrecy and authenticity. The public-key of each user can be placed in a public file, which can be distributed through a trusted key-distribution center to detect tampering.

Diffie and Hellman proposed a key distribution scheme (not a two-key cryptosystem) depending on the discrete logarithm problem (see U.S. Pat. No. 4,200,770). The first implementation of the public key concept was the Rivest, Shamir, and Adleman (RSA) algorithm (see U.S. Pat. No. 4,405,829), which depends on the discrete logarithm and factoring problems. Other public-key-cryptosystems based on the discrete logarithm and factoring problems include the public-key cryptosystem of T. ElGamal, "A public key cryptosystem and a signature scheme based on discrete logarithms", IEEE Transactions on Information Theory, vol. 31, 1985, pp. 469–472, and the signature schemes of M. O. Rabin, "Digital signatures and public-key functions as intractable as factorization", internal report of the MIT Laboratory for Computer Science, MIT/LCS/TR-212, 1979; T. Okamoto, "A fast signature scheme based on congruential polynomial operations", IEEE Transactions on Information Theory, vol. IT-36, pp. 47–53, 1990; A. Fiat and A. Shamir (European patent application Ser. No. 0,252,499 and U.S. Pat. No. 4,748,668); L. C. Gillou and J. -J. Quisquater, "A practical zero-knowledge protocol fitted to security microprocessor minimizing both transmission and memory", Advances in Cryptology EUROCRYPT '88, Berlin: Springer-Verlag, 1988, pp. 123–128; and Schnorr (U.S. Pat. No. 4,995,082 and European patent application Ser. No. 0,384,475).

The problem to be solved with many of the above schemes is the amount of computation for encoding and/or decoding. They all include modular exponentiation in the encoding and decoding function, which has a large time complexity $O(k^3)$ where k is the number of bits in the exponent and modulus. Interactive schemes, such as those of Schnorr, Gillou-Quisquater, and Fiat-Shamir have considerably less computation than RSA but tradeoff probability of cheating and storage space for accreditation terms. Precomputation is possible with Okamoto's and Schnorr's schemes, which is an advantage in applications such as chip cards.

An identification scheme based on the permuted-kernels problem and a zero-knowledge protocol was proposed by A. Shamir (see U.S. Pat. No. 4,932,056), which has a small amount of computation but has large signatures (relative to the Fiat-Shamir scheme) and requires about 10 Kbits of interactive communication between the verifier and the candidate.

A public-key cryptosystem based on error correcting codes was proposed by R. J. McEliece described in "A public key cryptosystem based on algebraic coding theory", JPL DSN Progress Report 42–44, January--

February 1978, pp. 114–116, which has several orders of magnitude less computation than RSA but has a message expansion factor of two (in bits) and a relatively large public-key of $2^{19}$ bits. Riek and McFarland described several techniques for implementing McEliece's cryptosystem (see U.S. Pat. No. 5,054,066). However, McEliece's cryptosystem was broken by V. I. Korzhik and A. I. Turkin as described in "Cryptanalysis of McEliece's public-key cryptosystem", Advances in Cryptology EUROCRYPT '91, Berlin: Springer-Verlag, 1991, pp. 68–70.

In 1978, R. C. Merkle and M. E. Hellman proposed a public-key cryptosystem based on the knapsack problem in "Hiding information and signatures in trapdoor knapsacks" IEEE Trans. Inform. Theory, vol. IT-24, 1978, pp. 525–530 (also see U.S. Pat. No. 4,218,582), that encrypts and decrypts about a hundred times faster than RSA. The knapsack weights are initially selected as a superincreasing series and then disguised by modular multiplication. Henry described a method of decoding the single-iterated Merkle-Hellman knapsack cryptosystem called "double-encryption" (see U.S. Pat. No. 4,399,323). However, Shamir broke the single-iterated Merkle-Hellman cryptosystem in 1984. Eventually all of the fast knapsack-type cryptosystems (Merkle and Hellman's scheme and variants proposed subsequently) were broken. The cryptanalysis of knapsack cryptosystems is reviewed by E. F. Brickell and A. M. Odlyzko in "Cryptanalysis: A survey of recent results", Proceedings of the IEEE, vol. 76, May 1988, pp. 578–592.

A fast knapsack-type public-key cryptosystem was proposed by S. C. Lu and L. N. Lee in "A simple and effective public-key cryptosystem", COM. SAT. Tech, Rev., vol. 9, no. 1, 1979, pp. 15–24, where the Chinese remainder theorem and a residue number system are used to select the initial knapsack weights. Several variants of the Lu-Lee cryptosystem were also proposed: B. S. Adiga and P. Shankar, "Modified Lu-Lee cryptosystem", Electronic Letters, vol. 21, no. 18, August 1985, pp. 794–795 and R. M. Goodman and A. J. McAuley, "New trapdoor knapsack public key cryptosystem", IEE Proceedings, vol. 132, part E, no. 6, November 1985, pp. 289–292. However, the Lu-Lee cryptosystem and all of its variants were broken as reviewed by Brickell and Odlyzko.

The main weakness in the broken knapsack schemes is their reliance on modular multiplication as the disguising technique. Brickell and Odlyzko stated in their 1988 paper that "These unusually good simultaneous diophantine approximations can be used to break all of the knapsack cryptosystems that have been proposed that rely on modular multiplications as a disguising technique" and "The Chor and Rivest knapsack cryptosystem is the only Knapsack cryptosystem that has been published that does not use some form of modular multiplication to disguise an easy knapsack". Chor and Rivest's knapsack cryptosystem, described in "A knapsack type public-key cryptosystem based on arithmetic in finite fields", Advances in Cryptology CRYPTO '84, Berlin: Springer-Verlag, 1985, pp. 54–65, is still unbroken but employs modular exponentiation for decryption and, as a result, has similar speed to RSA.

Compact knapsacks, such as the Lu-Lee cryptosystem, employ fewer knapsack weights and have larger coefficients representing the message, which results in a smaller public-key. However, if the number of knapsack weights is smaller than about four, then linear integer programming techniques can be used to decode the ciphertext without finding the private key (see Brickell and Odlyzko's review paper). Knapsack cryptosystems with many weights (three or more) are vulnerable to simultaneous diophantine approximation while those with few weights (four or less) are subject to integer programming.

Several knapsack-type cryptosystems have been proposed in the last few years. H. Isselhorst proposed a generalized knapsack cryptosystem, where a matrix is disguised by multiplying each element by the same fractional constant, in "The use of fractions in public-key cryptosystems", Advances in Cryptology EUROCRYPT '89, Berlin: Springer-Verlag, 1990, pp. 47–55. However, Isselhorst's scheme was broken by J. Stern and P. Toffin as described in "Cryptanalysis of a public-key cryptosystem based on approximations by rational numbers", Advances in Cryptology EUROCRYPT '90, Berlin: Springer-Verlag, 1991, pp. 47–55. V. Niemi has recently a knapsack cryptosystem related to algebraic coding theory, involving a matrix multiplication as the disguising operation, in "A new trapdoor in knapsacks", Advances in Cryptology EUROCRYPT '90, Berlin: Springer-Verlag, 1990, pp. 47–55, but his scheme has a relatively large public-key of 20 kbits and can not perform signatures. Niemi's cryptosystem was recently broken by Y. M. Chee, A. Joux, and J. Stern as described in "The cryptanalysis of a new public-key cryptosystem based on modular knapsacks", in Advances in Cryptology CRYPTO '91, Berlin: Springer-Verlag, 1991, pp. 204–212. C. S. Laih, J. Y. Lee, L. Harn, and Y. K. Su. recently proposed modifying the Merkle-Hellman scheme by adding a random term to each knapsack weight in "Linearly shift knapsack public-key cryptosystem", IEEE Journal Selected Areas in Communication, vol. 7, no. 4, May 1989, pp. 534–539, although decryption involves further computation and the public-key is about 40 kbits. L. X. Duan and C. C. Lian proposed a nonlinear form of the Lu-Lee cryptosystem involving modular exponentiation in "Modified LU LEE cryptosystems", Electronic Letters, vol. 25, no. 13, 1989, pp. 826, but their scheme was broken by L. D. Xing and L. G. Sheng in "Cryptanalysis of new modified Lu-Lee cryptosystems" Electronic Letters, vol. 26, no. 19, September 1990, pp. 1601–1602.

To summarize the prior art, the previously proposed public key cryptosystems that remain unbroken have problems to be solved in at least one of the following respects: the amount of computation for encoding and decoding, public and private key size, message expansion, communication delay, and signature size.

OBJECT OF THE INVENTION

Accordingly, it is an object of this invention to provide a public-key cryptosystem that can ensure secrecy and authenticity by private transmission of signed messages and signed keys-to-be-distributed, and identity verification.

It is another object to provide a public-key cryptosystem that employs a modest amount of computation and has a compact public key.

It is still another object to provide a public-key cryptosystem that can be implemented with a low-cost general-purpose processor such as a chip card, microprocessor, or digital signal processor.

BRIEF STATEMENT OF THE INVENTION

By one aspect of this invention, there is provided a cryptographic communication system comprising:

A. a communications channel;

B. an encoding means coupled to said channel and adapted for transforming a transmitted message signal $\{x_1, x_2, \ldots, x_n\}$ to a ciphertext signal $\{y_1, y_2, \ldots, y_m\}$ on said channel, where $\{x_1, x_2, \ldots, x_n\}$ corresponds to a set of integers representative of a message and $$x_i \in [0, 2^s),$$

for $i=1$ to $n$, where $n \geq 2$ and $s$ is some positive integer, and where $\{y_1, y_2, \ldots, y_m\}$ corresponds to a set of integers representative of an enciphered form of said message and corresponds to $$y_j = \sum_{i=1}^{n} x_i a_{ij} - A_x g_j \bmod q_j, \text{ for } j = 1 \text{ to } m',$$

$$y_j = \sum_{i=1}^{n} x_i a_{ij} - A_x g_j, \text{ for } j = m' + 1 \text{ to } m, \text{ and}$$

$$A_x = \left\lfloor -2^{-e-1} + \sum_{i=1}^{n} x_i f_i \right\rfloor,$$

where $m \geq 2$, $1 \leq m' < m$, and $r = 2$ ($r$ is the number of iterations of modular multiplication used to generate the public-key and $\lfloor \cdot \rfloor$ denotes truncation), and where the encoding key consists of integers $a_{ij}$, $g_j$, and fractions $f_i \in [0.0, 1.0)$, for $i=1$ to $n$ and $j=1$ to $m$, and $q_j$, for $j=1$ to $m'$, wherein $$a_{ij} \equiv |w'|wb_i|P|q_j,$$

$$g_j \equiv w'P \bmod q_j,$$

$$f_i = \frac{wb_i \bmod P}{P},$$

(in the present notation, $|c|_d$ is equivalent to $c \bmod d$) and where $\{b_1, b_2, \ldots, b_n\}$ is a superincreasing series with $$b_j > \sum_{i=1}^{j-1} b_i(2^s - 1) \text{ and}$$

$$P > \sum_{i=1}^{n} b_i(2^s - 1), \text{ and}$$

where $\{q_1, q_2, \ldots, q_m\}$ are chosen such that $$Q = \prod_{j=1}^{m} q_j > P(1 + 2^{-e}),$$

where $A_x$ has an approximation error bounded by $[-2^{-e-1}, 2^{-e-1})$ before truncation and the fractions $f_i$, for $i=1$ to $n$, are published to $s + \log_2 n + e$ bits precision, where $e$ is a positive number, and where $P$ is relatively prime to $b_i$, for $i=1$ to $n$, and where $\{q_1, q_2, \ldots q_m\}$ are pairwise relatively prime, and where $P$ and $Q$ are relatively prime, and where $w$ and $P$ are relatively prime, and where $w'$ and $Q$ are relatively prime; and C. a decoding means coupled to said channel and adapted for receiving $\{y_1, y_2, \ldots, y_m\}$ from said channel and for transforming $\{y_1, y_2, \ldots, y_m\}$ to a received message word signal $\{x'_1, x'_2, \ldots, x'_n\}$, wherein $\{x'_1, x'_2, \ldots, x'_n\}$ correspond to a set of numbers representative of a deciphered form of $\{y_1, y_2, \ldots, y_m\}$ and correspond to the solution of a knapsack problem $$b = \sum_{i=1}^{n} x'_i b_i$$

with superincreasing weights $\{b_1, b_2, \ldots, b_n\}$ and target value $$b \equiv |w^{-1}|w'^{-1}y|_Q|_P$$

where $y \equiv \{y_1, y_2, \ldots, y_m\} \bmod \{q_1, q_2, \ldots, q_m\}$, and where the knapsack problem is solved sequentially, for $i = n$ decrementing to $1$, according to the relation $$x'_i = \left\lfloor \frac{b - \sum_{j=i+1}^{n} x'_j b_j}{b_i} \right\rfloor$$

to return the deciphered message $\{x'_1, x'_2, \ldots, x'_n\}$, and where the decoding key is the positive integers $w$, $w'$, $\{q_1, q_2, \ldots, q_m\}$, $\{b_1, b_2, \ldots, b_n\}$, and $P$.

According to another feature of the invention, a digital signature of a message is generated with a decoding device using the private decoding-key of the sender and checked by the receiver with an encoding device using the public encoding-key of the sender. A message-to-be-signed is mapped to $\{y_1, y_2, \ldots, y_{m'}\}$, where $y_j \in [0, q_j)$, for $j=1$ to $m'$, and $1 \leq m' < m$. A total of $$\prod_{i=1}^{m'} q_j$$

unique messages-to-be-signed can be represented with one block $\{y_1, y_2, \ldots, y_{m'}\}$.

Messages larger than one block are either broken into multiple blocks that are signed separately or the message is compressed by a hash function before signing. To prevent a chosen ciphertext attack, we ensure that $\{y_{m'+1}, y_{m'+2}, \ldots, y_m\}$ can not be selected by an attacker. Random or pseudorandom numbers may be assigned to $\{y_{m'+1}, y_{m'+2}, \ldots, y_m\}$, where $y_j \in [0, q_j)$, for $j = m'+1$ to $m$. Alternatively, secret or public constants can be assigned to $\{y_{m'+1}, y_{m'+2}, \ldots, y_m\}$.

Deciphering $\{y_1, y_2, \ldots, y_m\}$ yields the signature $\{x_1, x_2, \ldots, x_n\}$. If the signature terms $x_i$, for $i=1$ to $n$, are not all in the range $[0, 2^s)$, then signature generation is repeated with some perturbation of $\{y_1, y_2, \ldots, y_m\}$ to ensure that any information about the secret weights $\{b_1, b_2, \ldots, b_n\}$ is not disclosed. The average number of signature generation trials is $P/2^{ns}$.

Signature verification involves encoding the signature to obtain the enciphered signature $\{y'_1, y'_2, \ldots, y'_{m'}\}$ and checking if $y_j \equiv y'_j \pm g_j \bmod q_j$, for $j=1$ to $m'$. To facilitate signature checking, a subset of the moduli $\{q_1, q_2, \ldots, q_{m'}\}$ is made public as part of the encoding key although the rest of the moduli $\{q_{m'+1}, q_{m'+2}, \ldots, q_m\}$ are kept secret. During encoding for signature checking, only the residues $\{y'_1, y'_2, \ldots, y'_{m'}\}$ corresponding to the public moduli $\{q_1, q_2, \ldots, q_{m'}\}$ are calculated.

The public-key for signatures requires $a_{ij}$ and $g_j$, for $i=1$ to $n$ and $j=1$ to $m'$; in contrast, secret messages have a larger public key including $a_{ij}$ and $g_j$, for $i=1$ to $n$ and $j=1$ to $m$. A combined secret message and signature scheme can be constructed with one key set (i.e. one public and private key per party) or separate schemes can be used (i.e. one key pair for secret messages and one pair for signatures).

According to another feature of the invention, the public-key can be minimized for signatures by using $n=1$ weights (secret messages are only secure with $n \geq 2$). In the exemplary case of $n=1$, $m'=1$, $m=2$, and $b_1 = 1$, the signature is $x \in [0, 2^s)$ and the public-key consists of $a_1 \equiv w'w \bmod q_1$, $g_1 \equiv w'P \bmod q_1$, and $f_1 = w/P$. The signature is verified by encoding $y'_1 \equiv x \cdot a_1 - [xf_1]g_1 \bmod q_1$ and checking $y_1 \equiv y'_1 \pm g_1 \bmod q_1$, where $y_1$ represents the message (or compressed message).

According to another feature of the invention, the public-key can be shortened by standardizing some of the variables in the public-key for all users in a network. The encoding and decoding function are unchanged but a subset of the public-key is identical for all parties. Partial standardization does not reduce the security considering known cryptanalytic attacks. In an exemplary case, let part of the public-key: $a_{nj}$ and $g_j$, for $j=1$ to $m$, and $\{q_1, q_2, \ldots, q_{m'}\}$, be standardized to values from their specified ranges. Part of the private key: $\{b_1, b_2, \ldots, b_n\}$, $P$, and $\{q_{m'+1}, q_{m'+2}, \ldots, q_m\}$, is secretly selected as usual. Then the rest of the private key, $w$ and $w'$, is calculated according to the relations: $w' \equiv P^{-1}g \bmod Q$ and $w \equiv |b_n^{-1}|w'^{-1}a_n|_Q|_P$ where $a_n \equiv \}a_{n1}, a_{n2}, \ldots, a_{nm}\} \bmod \{q_1, q_2, \ldots, q_m\}$ and $g \equiv \{g_1, g_2, \ldots, g_m\} \bmod \{q_1, q_2, \ldots, q_m\}$. The rest of the public weights $a_{ij}$, for $i=1$ to $n-1$ and $j=1$ to $m$, and $f_i$, for $i=1$ to $n$, are then chosen as usual and will vary between users.

According to another feature of the invention, the number of iterations of modular multiplication can be increased as in the broken multiple-iterated Merkle-Hellman cryptosystem. In the present invention, the main benefit of further modular multiplications is that an extra nonlinear term is added for each subsequent iteration, which may make the encoding problem harder.

According to another feature of the invention, decoding can be performed with the same approach (but different implementation) as the "double-encryption" technique of Henry, which was designed for the broken single-iterated Merkle-Hellman cryptosystem. The concept of "double encryption" is that the individual bits of the ciphertext are treated as the input to an encoder with a special encoding key that is designed to return b mod P. Then a superincreasing series with target value b is solved to return the deciphered message. Henry suggested that multiple-iterations of modular multiplication can be performed by sequential application of his technique, which is essentially a modular multiplier. Less computation is necessary with the present form of double-encryption, when there are multiple-iterations of modular multiplication as in the present decoder, because of the use of small nonlinear terms to account for each extra iteration as in the present encoder. There is a tradeoff between memory and speed.

According to another feature of the invention, $\{b_1, b_2, \ldots, b_n\}$ can be selected according to alternate procedures, although this may affect the security and performance in terms of message expansion, block size, decoding delay, and number of signature generation trials. In general, a more random assignment of $\{b_1, b_2, \ldots, b_n\}$ is more secure but causes message expansion and further signature generation trials. The Chinese remainder theorem can be used to construct $\{b_1, b_2, \ldots, b_n\}$ as in the data-base private-key cryptosystem of G. I. Davida, D. L. Wells, and J. B. Kam, "A database encryption system with subkeys", ACM Trans. Database Systems, vol. 6, no. 2, June 1981, pp. 312-328. Alternatively, the generalized form of the Chinese remainder theorem used in the broken Lu-Lee, Adiga-Shankar, and Goodman-McCauley cryptosystems can be employed. As well, mixed radix conversion can be employed to construct $\{b_1, b_2, \ldots, b_n\}$. Also, a non-superincreasing series can used as described by M. Willet, "Trapdoor knapsacks without superincreasing structure", Information Processing Letters, vol. Jul. 17, 1983, pp. 7-11.

The following functions of a public-key cryptosystem are established in the prior art and can be carried out with the present public-key cryptosystem. The present invention may be used with any length messages provided that the message is broken into suitable length blocks before encoding. The present public-key cryptosystem can be used to secretly and authentically distribute a session key for a private-key cryptosystem. As well, the present signature scheme can be used in access control systems to verify identity by asking the candidate to sign a random number or decrypt a ciphertext corresponding to a random message. A message-to-be-signed can be first encrypted with the present encoding device (using the public-key of the intended receiver) or using conventional encryption techniques. The present public-key cryptosystem may be used to ensure file integrity by encoding and signing data words to prevent unauthorized viewing and detect tampering.

The present invention potentially represents a significant advance in the field of public-key cryptography (depending on the success of cryptanalysis by the research community) because encoding and decoding with the present invention require about one hundred times less computation than for RSA and the public-key size is comparable.

DESCRIPTION OF THE PREFERRED EMBODIMENTS

Figure 1:
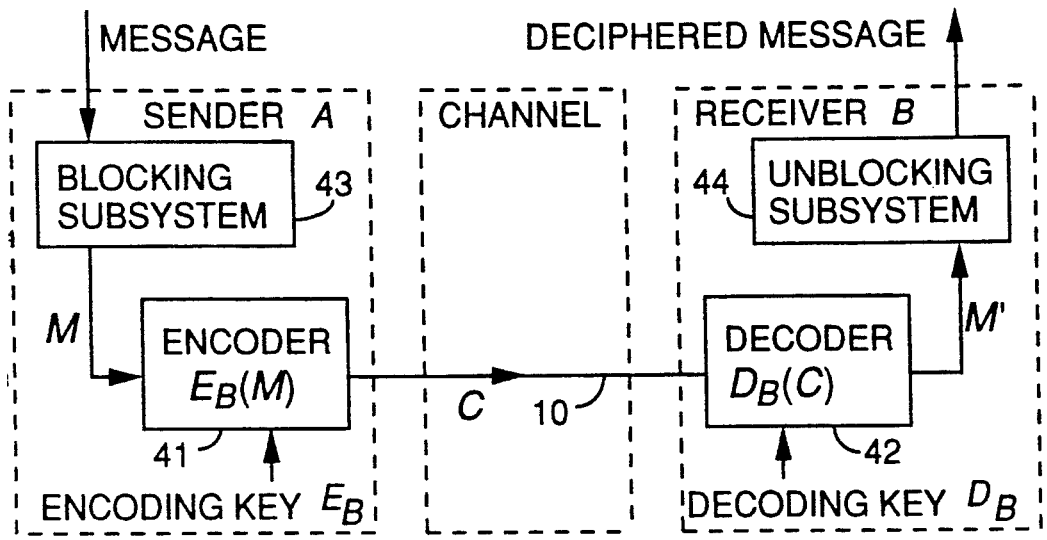
FIG. 1 shows in block diagram form, a communications system adapted to secretly transfer enciphered messages with a public-key cryptosystem in one direction between two terminals.

FIG. 1 shows in block diagram form the basic elements of secret transmission of data from the sender A to the receiver B with a public-key cryptosystem as proposed by Diffie and Hellman in the prior art. This system includes a communications channel 10 and two terminals coupled to the channel. First the message is divided into blocks (the block size depends on the particular encoding algorithm) by blocking subsystem 43. Then the sender A encodes each message block M with encoder 41 and the encoding key of the receiver $E_B$ to form the ciphertext $C=E_B(M)$. Next, each ciphertext block C is sent to the receiver B on the communications channel 10. The receiver decodes each ciphertext block C with decoder 42 and his/her own decoding key $D_B$ to form the deciphered message block $M'=D_B(C)$. Finally, the decrypted message is formed by unblocking subsystem 44.

The present invention is a public-key cryptosystem that provides a specific definition of the encoder and decoder of FIG. 1. A complete cryptographic communications system, may also include blocking/unblocking systems, communication channels, a computational device for encoding/decoding such as a microprocessor, write-only registers, tamperproof enclosures, electromagnetic radiation shielding, etc. The system of FIG. 1 is suitable for the one-way transfer of secret messages from terminal A to terminal B but the same method can be used for secret transfers from B to A or between any number of parties.

Figure 2:
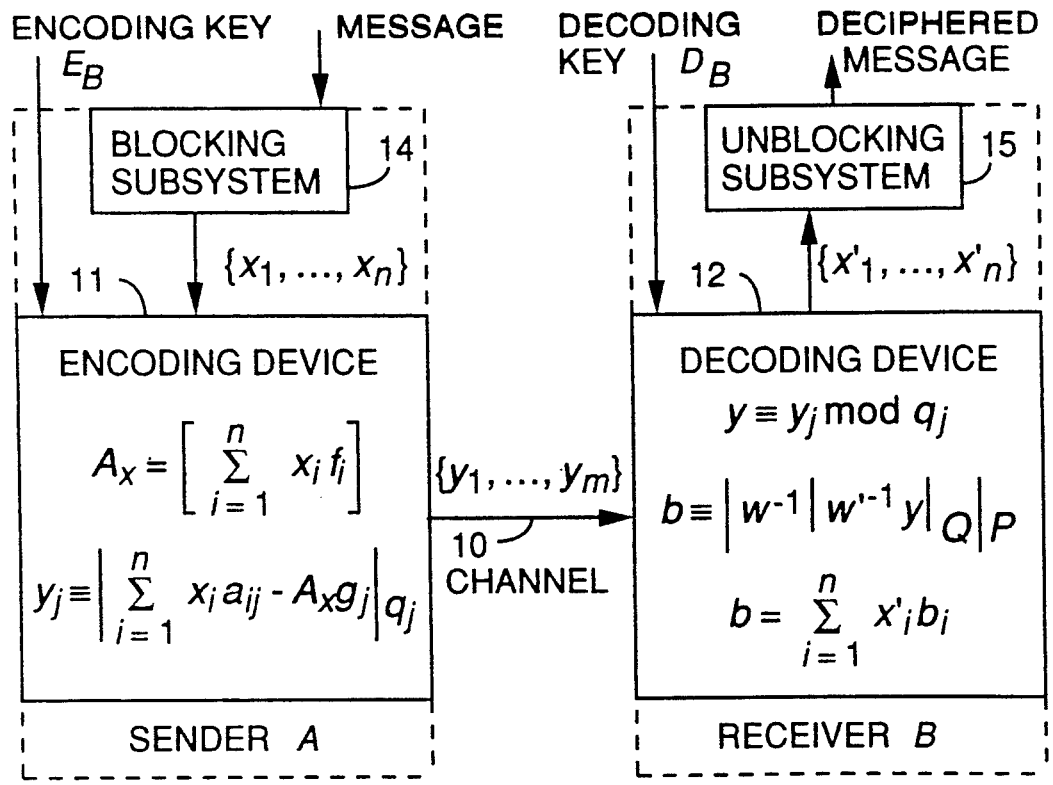
FIG. 2 shows in block diagram form, an embodiment of the system of FIG. 1 using the present invention (i.e. the present public-key cryptosystem)

FIG. 2 shows in block diagram form an embodiment of the secret message transmission system of FIG. 1 using the present invention, which defines the encoding function E(M) and decoding function D(C). The message is transformed to ciphertext on a block by block basis and one such block consists of terms $\{x_1, x_2, \ldots, x_n\}$, where $x_i \in [0, 2^s)$, for $i=1$ to n, and $n \geq 2$. Each message block contains ns bits.

The message M is assigned to each message block $\{x_1, x_2, \ldots, x_n\}$ and may be concatenated with standard information (such as time, date, message number, or certain bit patterns) or random bits; these blocking functions are performed by subsystem 14. The inclusion of standard or random fields is a common cryptographic practice to ensure that identical message blocks are enciphered differently, carry out various record keeping functions, and to guard against tampering and chosen ciphertext attacks. The concatenation of the message data with standard information or random bits is performed such that each combined term $x_i$, for $i=1$ to n, is still in the range $[0, 2^s)$. A block $\{x_1, x_2, \ldots, x_n\}$ will be referred to as a message block although it will be understood that each block may contain standard or random information in part.

For messages represented by numbers outside the range $[0, 2^s)$, a conventional blocking means (subsystem 14) is utilized to break the message into message block words before encoding, where each block is represented by a number from the specified range. Following subsequent decoding, the recovered block words may be transformed back to the original message by unblocking subsystem 15.

The presently described encoding device can distinctly encode each of the $2^{ns}$ possible messages. In alternative but equivalent embodiments, the above ranges may be generalized as $x_i \in [h_i, h_i+d_i)$, where $d_i$ is the number of assignable states in the ith term of the message set, the total number of message states is $$\prod_{i=1}^{n} d_i,$$

and $h_i$, for $i=1$ to n, are arbitrary integers. Accordingly, the range limitations for $x_i$, for $i=1$ to n, expressed hereafter in this application are appropriate for numbers (representing messages) in the specified range, but it will be understood that other range limitations are considered to be equivalent and are intended to be embraced by the claims.

The encoding device 11 transforms the message $\{x_1, x_2, \ldots, x_n\}$ to the ciphertext $\{y_1, y_2, \ldots, y_m\}$ according to the relations $$y_j = \sum_{i=1}^{n} x_i a_{ij} - A_x g_j \bmod q_j, \text{ for } j = 1 \text{ to } m',$$

$$y_j = \sum_{i=1}^{n} x_i a_{ij} - A_x g_j, \text{ for } j = m' + 1 \text{ to } m, \text{ and}$$

$$A_x = \left[ -2^{-e-1} + \sum_{i=1}^{n} x_i f_i \right],$$

where $1 \leq m' < m$, $m \geq 2$, and n, m', and m are positive integers.

In a public-key cryptosystem, the encoding key is publicly revealed but only $\{q_1, q_2, \ldots, q_{m'}\}$ are part of the public encoding key and can be used to reduce $\{y_1, y_2, \ldots, y_{m'}\}$ during encoding. A subset $\{y_1, y_2, \ldots, y_{m'}\}$ of the ciphertext residues $\{y_1, y_2, \ldots, y_m\}$ are reduced mod $\{q_1, q_2, \ldots, q_{m'}\}$ during encoding, whereas $\{y_{m'+1}, y_{m'+2}, \ldots, y_m\}$ are reduced mod $\{q_{m'+1}, q_{m'+2}, \ldots, q_m\}$ during decoding because $\{q_{m'+1}, q_{m'+2}, \ldots, q_m\}$ are part of the secret decoding key.

The encoding key $E_B$ consists of integers $a_{ij}$, $g_j$, and fractions $f_i \in [0.0, 1.0)$, for $i=1$ to n and for $j=1$ to m, and positive integers $\{q_1, q_2, \ldots, q_{m'}\}$ where $$a_{ij} \equiv |w'|wb_i|P|q_j,$$

$$g_j \equiv w'P \bmod q_j,$$

$$f_i = \frac{wb_i \bmod P}{P}.$$

The present encoder has the effect of recombining the message terms $\{x_1, x_2, \ldots, x_n\}$ according to $$b = \sum_{i=1}^{n} x_i b_i \bmod P$$

and performing several modular multiplications, by w mod P and w' mod Q, before expressing the ciphertext in the Q residue number system (the public encoding function is a disguised version of these operations as defined above for encoding subsystem 11). The initial weights $\{b_1, b_2, \ldots, b_n\}$ can be selected as a superincreasing series with $$b_j > \sum_{j=1}^{i-1} b_j(2^s - 1) \text{ and}$$

-continued $$P > \sum_{i=1}^{n} b_i(2^s - 1),$$

where $b_i$ and P are relatively prime, for $i=1$ to n.

With presently known attacks, we can set $b_i = 2^{(i-1)s}$, for $i=1$ to n. Alternatively, the size of each message term can be varied with $x_i$ [0, $2^{s_i}$) and $$b_i = 2 \exp\left(\sum_{j=1}^{i-1} s_j\right).$$

The security is potentially increased if $\{b_1, b_2, \ldots, b_n\}$ are randomly chosen from a sufficiently large range so that they can not be guessed by exhaustive search in a reasonable amount of time although this precaution is not essential with presently known attacks. The message expansion and consequent number of signature generation trials $P/2^{ns}$ is directly related to the size of the selection ranges. A compromise between security and message expansion is to select $b_i$ randomly from $[v_i, (1.0+u)v_i]$, where $$v_i = 1 + \sum_{j=1}^{i-1} b_j(2^s - 1)$$

and $u \geq 0.0$. The number of possibilities for $b_i$ is $uv_i$, which increases with s for a constant u.

The difference $P - v_{n+1}$ should be large to ensure that multiplication modulo P strengthens the security ($v_{n+1}$ is the maximum value of b) so P can be randomly selected from $[(1.0+u/2)v_{n+1}, (1.0+u)v_{n+1}]$. Then $P < 2^{n(s+u)}$ and the average number of signature generation trials is $P/2^{ns} < 2^{nu}$, which is less than two if $u < 2.0/n$.

A few bits of message expansion is usually not significant for secret key-distribution so exemplary parameters are $u=0.5$, and $z=2^t$. The average number of signature generation trials, $P/2^{ns} < 2^{nu}$, is only affected by the redundancy in the ring of integers mod P, which is determined by u. Then a smaller u is preferable for signatures such as $u < 2/n$. The security against exhaustive search for $b_i$, for $i=1$ to n, can be maintained by increasing s so that the number of possibilities $uv_i$ for each $b_i$ remains large.

The ciphertext is represented as a number $\{y_1, y_2, \ldots, y_m\}$ in a residue number system with relatively prime moduli $\{q_1, q_2, \ldots, q_m\}$ and a range of $$Q = \prod_{j=1}^{m} q_j.$$

Moduli $\{q_1, q_2, \ldots, q_{m'}\}$ are public and may be selected to simplify modular reduction such as $2^t \pm z$, where t and z are positive integers and z is minimized. Although a power of two $2^t$ is conjectured to be sufficiently secure for one of $\{q_1, q_2, \ldots, q_{m'}\}$, other choices may be made to increase the security such as random values from the range $[2^t, 2^t + z)$, where t and z are positive integers, or nonrandom values with certain bit patterns.

The secret moduli $\{q_{m'+1}, q_{m'+2}, \ldots, q_m\}$ are selected randomly from a sufficiently large interval $[2^t, 2^t + z)$. The attacker knows that $q_j > a_{ij}$, for $i=1$ to n, unless the published $a_{ij}$ are not fully reduced mod $q_j$ which increases the message expansion and public-key size. To prevent the case where $a_{ij}$ is close to $2^t + z$ and reveals information about $q_j$, key-generation is repeated (changing $b_i$, $q_j$, or other parts of the private key) if $a_{ij}$ mod $q_j > 2^t$ and the published $a_{ij}$ is fully reduced modulo $q_j$ and is in the range $[0, 2^t)$. Selecting $z > 2^t$ does not significantly increase the security. Decreasing z minimizes the average number of key-generation attempts. Exemplary values of z are $z = 2^t$ or $z = 2^{t-3}$ (in practice, $t > 3$ so the security is not significantly diminished).

The secret modular multiplication constant w is relatively prime to P and w is chosen randomly from the interval $[0, P)$ (before testing for relative primality with P). Similarly, w' is chosen randomly from $[0, Q)$ such that w' and Q are relatively prime.

The moduli $\{q_1, q_2, \ldots, q_m\}$ are all pairwise relatively prime and satisfy $Q > P(1 + 2^{-e})$, where the approximation error in the estimate of $A_x$ is bounded by $[-2^{-e-1}, 2^{-e-1})$ before truncation. The fractions $f_i$, for $i=1$ to n, are each kept to $s + \log n + e$ bits, where $x_i \in [0, 2^s)$ and $e > 0$, (all logarithms will be base two). Encoding satisfies $$\sum_{i=1}^{n} x_i \lfloor wb_i \rfloor_P - A_x P \in [0, P(1 + 2^{-e})) \in [0, Q)$$

because $2^{-e-1}$ is subtracted from $A_x$ before truncation to prevent a negative lower bound. In general, if $$\sum_{i=1}^{n} x_i \lfloor wb_i \rfloor_P - A_x P \in [c, c + Q),$$

where c is some integer, then the reduced value modulo Q during decoding has to be shifted by a multiple of Q to fall in the range $[c, c+Q)$ to return the message. With $c=0$ (as is the case with the above definition of $A_x$), complete reduction modulo Q during decoding will correctly return the message. A large value of e weakens the security and a small value of e increases the message expansion (but not the number of signature generation trials). Exemplary values of e are 1 or 3.

Figure 3:
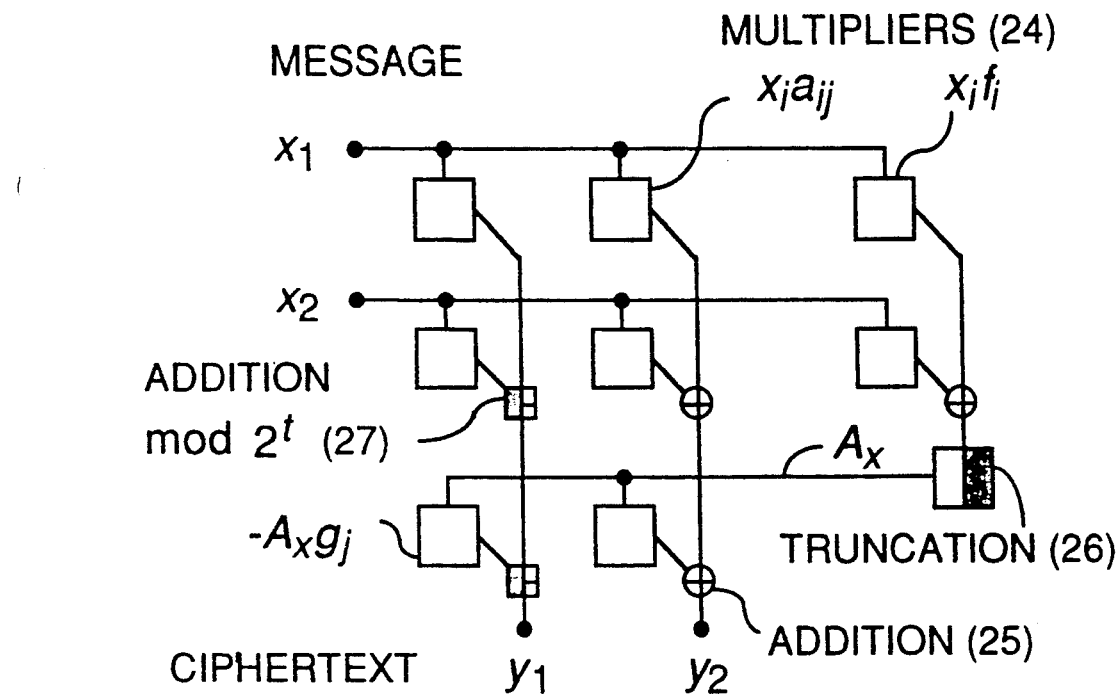
FIG. 3 shows in detailed block diagram form, the encoding device in the system of FIG. 2.

An exemplary form of the encoding subsystem 11 is shown in FIG. 3. The encoder consists of a parallel array of multipliers 24, which are accumulated by column with a tree of adders for each column. Alternatively, the encoding subsystem 11 could be implemented sequentially with a single microprocessor in less than a second but FIG. 3 shows a parallel implementation to show how to minimize the encoding delay by parallelization and to illustrate the structure of the encoding algorithm. In FIG. 3, there is one row for each message term $x_i$, for $i=1$ to n, and one column for each ciphertext residue $y_j$, for $j=1$ to m. The multiplier 24 at the ith row and jth column computes $x_i a_{ij}$; this product is accumulated with an adder 25 for the jth ciphertext residue. The public ciphertext modulus in this example is $q_1 = 2^t$; the modular reduction of $y_1$ mod $q_1$ is accomplished in FIG. 3 by discarding the overflow bits beyond $2^t$ with the adders 27 in column one. FIG. 3 shows the case of $n=2$ and $m=2$; n and m may be increased by adding further rows and columns respectively. There has to be one or more modulo reduced columns (i.e. $m' \geq 1$) and one or more unreduced columns (i.e. $m > m'$). Also, there is one extra column (independent of n and m) to calculate $A_x$, where the parallel multiplier 24 at the ith row in the rightmost column calculates $x_i f_i$, which is accumulated with adders 25. Then truncation subsystem 26 subtracts $2^{-e-1}$ from the sum of the rightmost column and then $A_x$ is the integer part of the sum. As well, there is one extra row (at the bottom of FIG. 3) to calculate $-A_x g_j$, for $j=1$ to m, which is accumulated for $y_j$.

The products $x_i f_i$, for $i=1$ to n, have to be precise to $e+\log n$ fractional bits to ensure that $A_x$ is precise to e fractional bits before truncation (i.e. the approximation error of $A_x$ is bounded by $[-2^{-e-1}, 2^{-e-1})$ before truncation). The fractions $f_i$ are precise to $s+\log n+e$ fractional bits and the message terms $x_i$ are s bit integers. A conventional multiplication of $x_i f_i$ is precise to $s+\log n+e$ fractional bits but computation can be saved by computing the partial products to $e+\log n+\log h$ fractional bits, where there are h partial products to be accumulated to form the product. The number of partial products h depends on the design of the parallel multiplier or the word size of the processor and the multiplication algorithm (for a detailed description of multipliers, see K. Hwang, "Computer arithmetic", New York: John Wiley, 1979).

FIG. 3 is a parallel architecture, which minimizes the encoding delay. A one-dimensional or linear tree of adders is shown in FIG. 3 but a faster binary or Wallace tree of adders can be used. This architecture can be pipelined to increase the clock rate, and hence throughput, by including one clocked latch in each accumulation tree after each row and delaying the input message terms in the ith row with $i-1$ latches. As well, the multipliers can be pipelined and fast adders can be used such as the carry-save or carry lookahead adders. The multiplier inputs are several hundred bits long so smaller multipliers may be combined to form each multiplier subsystem 24.

The amount of computation in encoding subsystem 11 is small enough that a programmed digital computer, microprocessor, chip card, or digital signal processor can encode fast enough for many applications. Although the encoding operation is well suited to a general purpose processor, a custom integrated circuit may be used with the advantage of including special write-only registers for secret keys that are erased if tampering is detected and other security or communication functions. In alternative embodiments, other multiplication and accumulation procedures may readily be utilized in keeping with the present invention.

Once the ciphertext $\{y_1, y_2, \ldots, y_m\}$ is encoded in FIG. 2, it is sent by the communication channel 10 to the receiver B. The deciphered message $\{x'_1, x'_2, \ldots, x'_n\}$ is found by the decoding device 12 by first calculating $$b \equiv |w^{-1}|w'^{-1}y|_Q|_P$$

where $y \equiv \{y_1, y_2, \ldots, y_m\} \bmod \{q_1, q_2, \ldots, q_m\}$. Then a knapsack is solved with the secret weights $\{b_1, b_2, \ldots, b_n\}$ and target value b:

$$b = \sum_{i=1}^{n} x'_i b_i.$$

With superincreasing initial weights $\{b_1, b_2, \ldots, b_n\}$, the deciphered message is found sequentially from $x'_n$ to $x'_1$, where $b_n$ is the largest superincreasing weight. First, $x'_n = [b/b_n]$ is found ([ · ] denotes truncation). Then the deciphered message term corresponding to the second largest weight is found: $x'_{n-1} = [(b-x'_n b_n)/b_{n-1}]$ and in general $$x_i' = \left[ \frac{b - \sum_{j=i+1}^{n} x_j' b_j}{b_i} \right],$$

for $i=n$ decrementing to 1. The deciphered message $\{x'_1, x'_2, \ldots, x'_n\}$ is equal to the original message $\{x_1, x_2, \ldots, x_n\}$.

The weighted value y of the residues $\{y_1, y_2, \ldots, y_m\}$ can be reconstructed with the Chinese remainder theorem according to:

$$y = \left| \sum_{j=1}^{m} Q_j |y_j Q_j^{-1}|_{q_j} \right|_Q$$

where $Q_j = Q/q_j$, or by mixed-radix conversion (conversion of a residue number to a weighted value is reviewed in "Residue number system arithmetic: modern applications in digital signal processing", IEEE press (1986), pp. 1–9).

There is less computation during decoding if the w' modular multiplication is unwound in the Q residue number system according to $y'_i \equiv y_j w'_j^{-1} \bmod q_j$, for $j=1$ to m, rather than unwinding the weighted values as $y' \equiv y w'^{-1} \bmod Q$. The decoding key is completely specified by the positive integers $\{b_1, b_2, \ldots, b_n\}$, w, w', Q, and P but a practical implementation of a decoder may also employ, $\{q_1, q_2, \ldots, q_m\}$, and other constants related to the Chinese remainder theorem or mixed-radix conversion.

Figure 4:
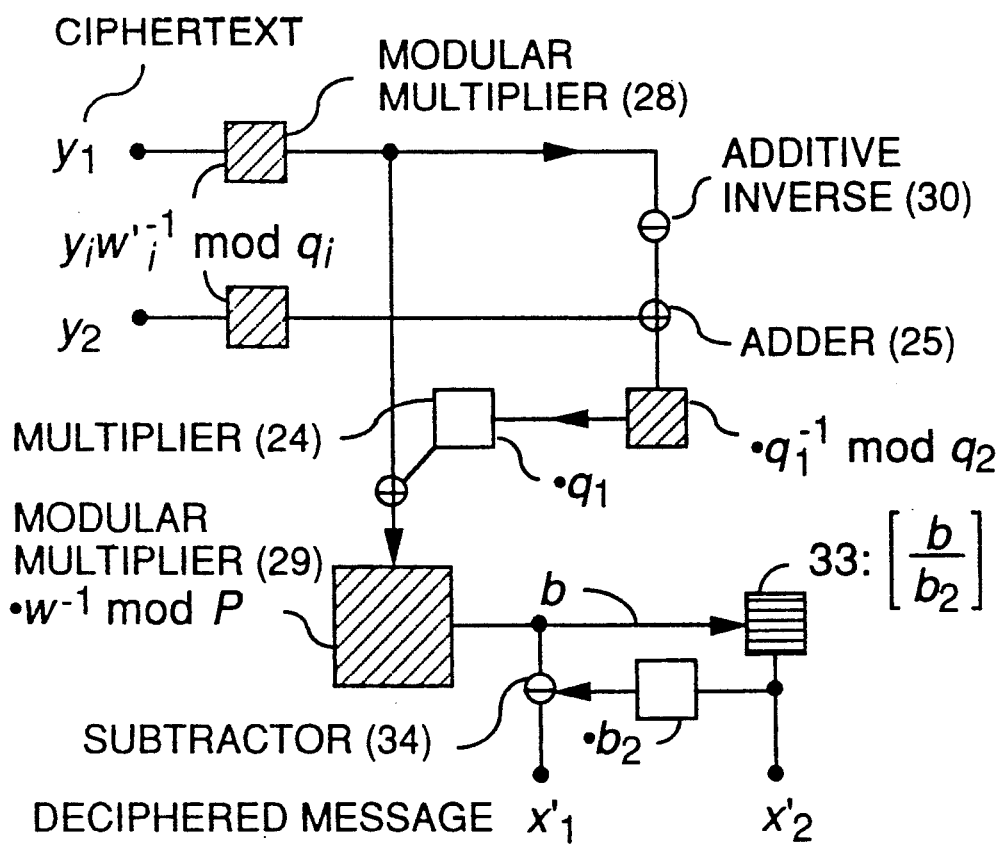
FIG. 4 shows in detailed block diagram form, the decoding device in the system of FIG. 2.

An exemplary form of the decoding device is shown in FIG. 4 with $n=m=2$. First the w' modular multiplication is unwound, $y'_i \equiv y_i w'_i^{-1} \bmod q_i$, for $i=1$ to m, with residue modular multipliers 28. Then mixed radix conversion is applied to the resulting residues $\{y'_1, y'_2\}$ to find $y' \equiv y w'^{-1} \bmod Q$ according to the relation $$y' \equiv q_1 |(y'_2 - y'_1) q_1^{-1}|_{q_2} + y'_1.$$

In FIG. 4, mixed-radix conversion is implemented with an additive inverse 30 that calculates $-y'_1$, a modular adder 25 that finds $y'_2 - y'_1$, a modular multiplier 28 that multiplies by $q_1^{-1}$ modulo $q_2$, and a multiplier 24 that multiplies by $q_1$. Then $b \equiv y' w^{-1} \bmod P$ is calculated by modular multiplication block 29. Next, a superincreasing series $$b = \sum_{i=1}^{n} x_i' b_i$$

is solved by subsystem 33 according to the relation $$x_i' = \left[ \frac{b - \sum_{j=i+1}^{n} x_j' b_j}{b_i} \right],$$

for $i=n$ decrementing to 1, to return the deciphered message terms $\{x'_1, x'_2, \ldots, x'_n\}$. With $n=2$, $x'_2 = [b/b_2]$ and $x'_1 = [b-b_2[b/b_2]/b_1]$; in the exemplary case of FIG. 4, $b_1=1$ so $x'_1 = b-b_2[b/b_2]$. If the weights $\{a_1, a_2, \ldots, a_n\}$ were permuted during key generation, then the deciphered message is similarly permuted.

Many modular multiplication techniques, as well as modular addition and subtraction techniques, are established in the prior art. For example, see E. F. Brickell, "A survey of hardware implementations of RSA", in Advances in Cryptology CRYPTO '89, Berlin: Springer Verlag, 1989, pp. 368–370 and M. A. Soderstrand, W. K. Jenkins, G. A. Jullien, and F. J. Taylor (editors), "Residue number system arithmetic: modern applications in digital signal processing", Reprint Series, New York: IEEE PRESS, 1986. If one input of a modular multiplier is a constant (such as modular multipliers 28 and 29), then some precomputation is possible as employed by Henry (see U.S. Pat. No. 4,399,323) for the now-broken Merkle-Hellman cryptosystem. This approach is described next for a general modular multiplier by a constant.

To compute ab mod c, where b and c are any fixed constants and $$a = \sum_{i=0}^{k/v} a_i 2^{iv} < 2^k$$

with $a_i \in [0, 2^v)$ and v is some positive integer, first $\hat{b}_i \equiv b 2^{iv} \bmod c$, for $i = 1$ to $k/v$, is precomputed and then $$\sum_{i=0}^{k/v} a_i \hat{b}_i$$

is calculated for each a value. This sum is congruent to ab mod c but may be up to $v + \log_2 k/v$ bits larger so a final reduction modulo c is necessary. The amount of computation is minimized with $v = 1$ but the precomputation needs $k^2/v$ bits of memory. Alternately, $k/v$ precomputed lookup tables can be employed, where the ith table outputs $a_i \hat{b}_i \bmod c$ for an input of $a_i \in [0, 2^v)$ and the table outputs are accumulated, although this increases the memory to $2^v K^2/v$.

In an alternate embodiment of the encoder of FIG. 3, the above modular multiplication technique can be used to compute $x_i a_{ij} \bmod q_j$, for $i = 1$ to n and $j = 1$ to m', for arbitrary $q_j$. Then the multiplier in the ith row and jth column of FIG. 3 is replaced by a module that calculates $$\sum_{k=0}^{s/v} x_{ik} \hat{a}_{ijk},$$

where $$x_{ik} = \sum_{k=0}^{s/v} x_{ik} 2^{kv}$$

and $\hat{a}_{ijk} \equiv a_{ij} 2^{kv} \bmod q_j$. The amount of computation is reduced if the final reduction modulo $q_j$ is delayed until after the column accumulation.

With these encoding and decoding devices, a message sent from the encoding device to the decoding device is transformed from $\{x_1, x_2, \ldots, x_n\}$ to $\{y_1, y_2, \ldots, y_m\}$ by the encoding device, and then back from $\{y_1, y_2, \ldots, y_m\}$ to $\{x'_1, x'_2, \ldots, x'_n\}$ by the decoding device, where $\{x'_1, x'_2, \ldots, x'_n\} = \{x_1, x_2, \ldots, x_n\}$.

Figure 5:
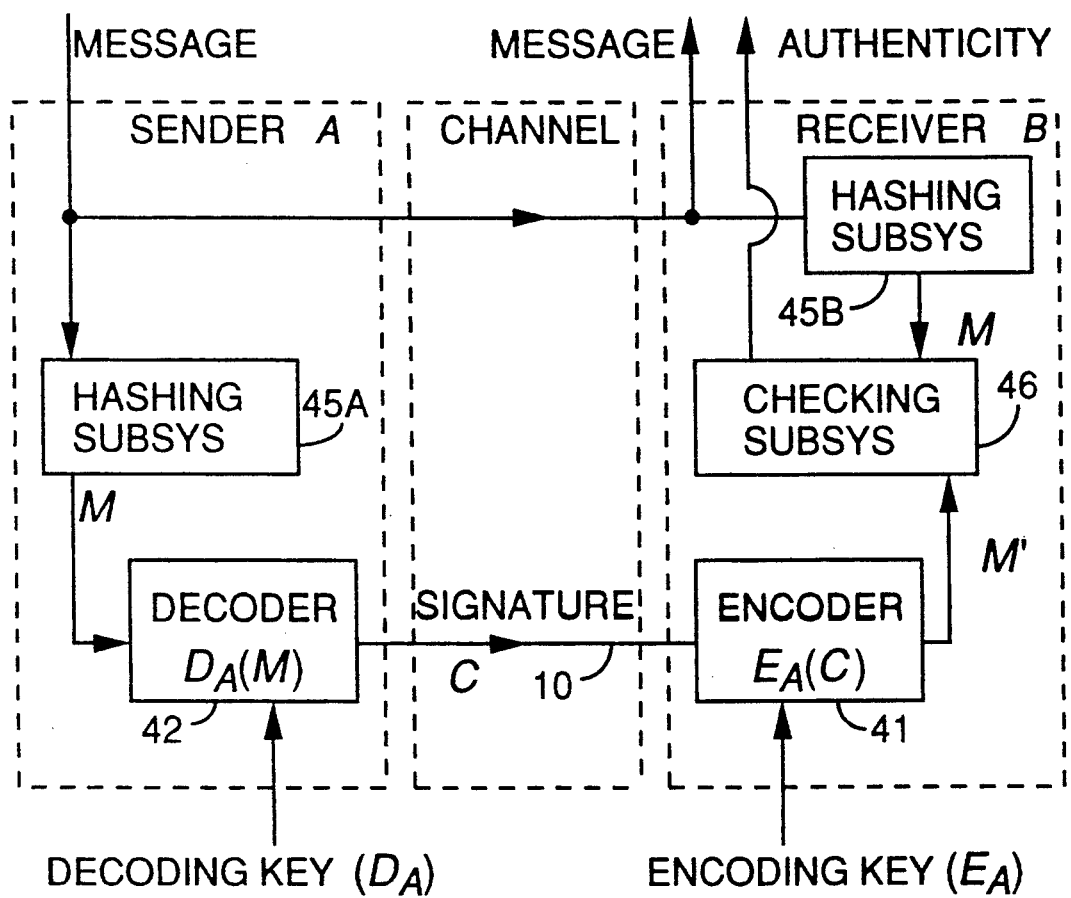
FIG. 5 shows in block diagram form, a communications system adapted to transfer signed messages with a public-key cryptosystem in one direction between two terminals.

FIG. 5 shows in block diagram form the basic elements of sending signed messages with a public-key cryptosystem as proposed by Diffie and Hellman. This system includes a communications channel 10 and two terminals coupled to the channel. The sender A may first compress the message into the hash value M with hashing subsystem 45A such that M is does not exceed the block size of the decoder. Then M is signed by applying M as the input to a decoder 42 with the decoding key of the sender $D_A$ to form the signature $C = D_A(M)$. The signature is sent to the receiver along a communication channel 10. The receiver B encodes the signature C with an encoder 41 and the sender's encoding key $E_A$ to form the check value $M' = E_A(C)$. The sender also sends the message (or enciphered message) to the receiver along a communication channel 10 and the receiver forms a hash value M of the message (or deciphered message) with an identical hashing subsystem 45B. Then the checking subsystem 46 signals that the message is authentic if $M = M'$. Before the receiver B can encode and verify the signature, the sender A has to send his/her identification string to the receiver B along the channel 10 so that the receiver knows to use the public encoding-key $E_A$. The identification string may be prepended or appended to the signature (this step is not shown in FIG. 5).

In an alternate configuration, each block of the message can be signed independently; then the message can be recovered from the signature (and does not have to be sent independently) but the receiver has to check that the message is meaningful or contains certain standard information. The system of FIG. 5 is suitable for the one-way transfer of signed messages from terminal A to terminal B but the same method can be used for signed message transfers from B to A or between any number of terminals.

Figure 6:
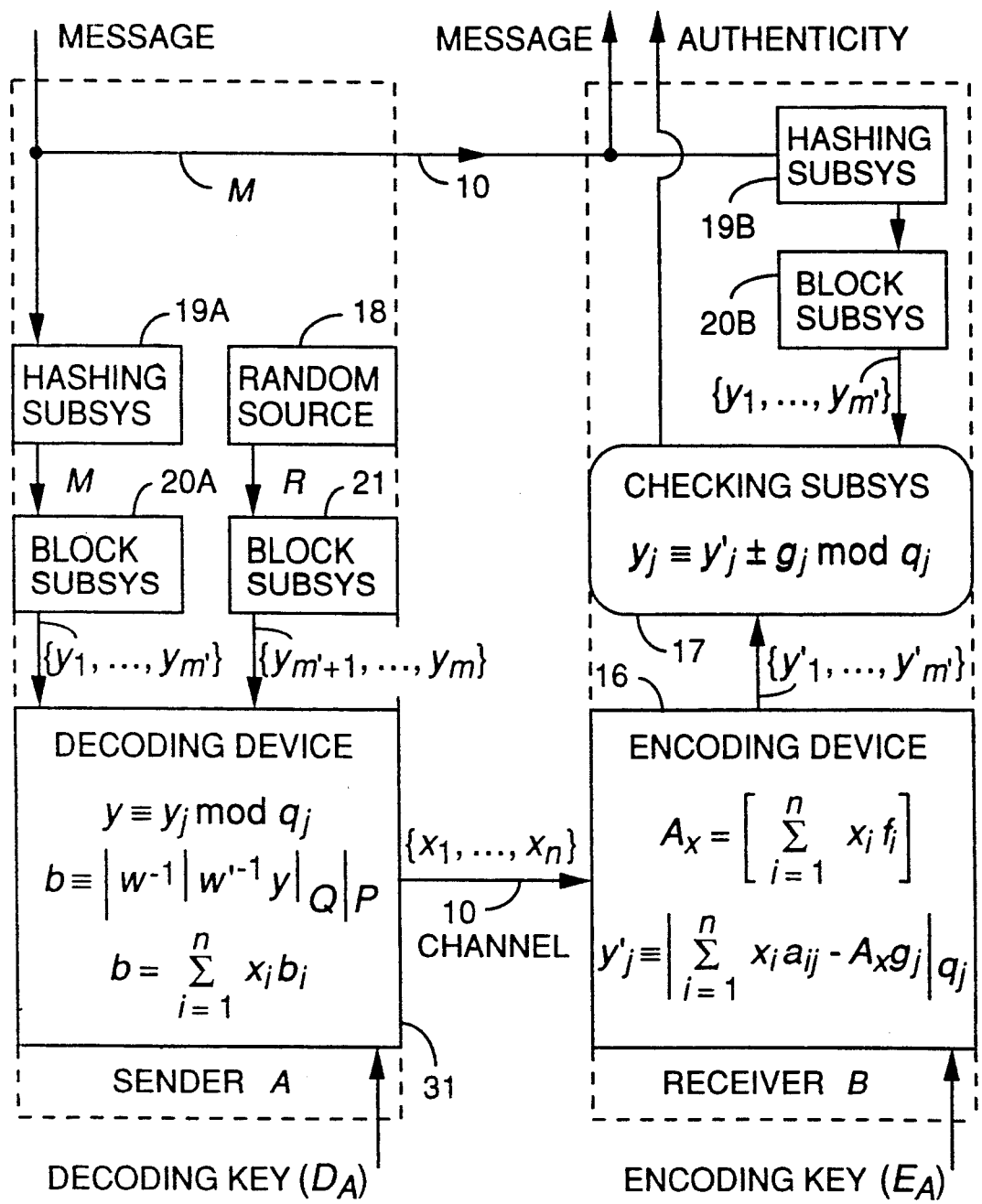
FIG. 6 shows in block diagram form, an embodiment of the system of FIG. 5 using the present invention.

FIG. 6 shows in block diagram form a cryptographic communication system for sending signed messages between two terminals in one direction in accordance with the present invention. In FIG. 6, a message-to-be-signed is first compressed in a hashing subsystem 19A if it exceeds the block size (as defined below) of the blocking subsystem 20A although the message may, in alternative embodiments, be broken into blocks that are signed separately. Then the hash value M is assigned to terms $\{y_1, y_2, \ldots, y_{m'}\}$ in blocking subsystem 20A, where $y_j \in [0, q_j)$, for $j = 1$ to m', and $1 \leq m' < m$. The maximum block size of blocking subsystem 20A is the product of the public ciphertext moduli $\{q_1, q_2, \ldots, q_{m'}\}$. An exemplary configuration is to assign t bits of the hash value M to $y_j$, for $j = 1$ to m', where $q_j \geq 2^t$, and then the block size of subsystem 20A corresponding to the hash function M is tm' bits. Secret bits from a random (or pseudorandom) source 18 are assigned to the terms $\{y_{m'+1}, y_{m'+2}, \ldots, y_m\}$ by blocking subsystem 21, where $y_j \in [0, q_j)$, for $j = m' + 1$ to m. For example, if $q_j \geq 2^s$, for $j = m' + 1$ to m, then s random bits can be assigned to $y_j$, for $j = m' + 1$ to m, and the block size of subsystem 21 corresponding to the random number R is $s(m - m')$ bits. Then the sender decodes $\{y_1, y_2, \ldots, y_m\}$ with a decoder 31 and the decoding key of the sender $D_A$ yielding the signature $\{x_1, x_2, \ldots, x_n\}$.

In alternative embodiments, the values of $\{y_{m'+1}, y_{m'+2}, \ldots, y_m\}$ do not have to be random and if they are kept constant, they do not have to be secret, although such measures may be employed as a security precaution against undiscovered attacks. However, party A has to ensure that other parties such as a forger can not select a series of values to perform a chosen-ciphertext attack or know the values if they are changed.

During decoding with device 31 in FIG. 6, the signature is tested to see if $x_j < 2^s$, for $j = 1$ to n. If this test is failed, then signature generation is repeated with new randomly-assigned residues $\{y_{m'+1}, y_{m'+2}, \ldots, y_m\}$.

Alternatively, the present randomly assigned residues can be modified by any function, such as adding one to $y_m$ mod $q_m$. This test is designed to thwart an attack wherein signatures $\{x_1, x_2, \ldots, x_n\}$ are collected to reduce the search space for the secret initial weights $\{b_1, b_2, \ldots, b_n\}$ (because the attacker knows that $b_i > x_{i-1} 2^{s(i-1)}$, for $i=2$ to n), but this test may not be necessary because many signatures are needed for this attack to be effective depending in part on the number of choices for the initial weights, which increases with u and s (there are $uv_i$ choices for $b_i$ as specified above). If u is increased, then P increases relative to $2^{ns}$ and the average number of signature generation trials $P/2^{ns}$ grows. Regardless of whether the test, $x_j < 2^s$, for $j=1$ to n, is included in the decoder 31, the value of s can be increased to strengthen the security against exhaustive search for $\{b_1, b_2, \ldots, b_n\}$ while retaining a small number of trials for signature generation.

Once a signature is created by the sender in FIG. 6, the signature is sent to the receiver along a communication channel 10. The receiver then encodes the signature $\{x_1, x_2, \ldots, x_n\}$ with encoder 16 and the sender's public encoding key $E_A$. Encoding 16 to check a signature, which involves transforming $\{x_1, x_2, \ldots, x_n\}$ to $\{y'_1, y'_2, \ldots, y'_{m'}\}$, uses less computation than encoding a message block $\{x_1, x_2, \ldots, x_n\}$ to a ciphertext block $\{y_1, y_2, \ldots, y_m\}$ (see subsystem 11 in FIG. 2) because $m' < m$. If only signatures are required, the size of the public encoding-key $E_A$ is smaller because the residues of the knapsack weights $a_i$, for $i=1$ to n, and g do not have to be published with respect to $\{q_{m'+1}, q_{m'+2}, \ldots, q_m\}$.

The message is also sent to the receiver along the communication channel. This message may be sent in plaintext or be enciphered with a conventional code or a public-key cryptosystem, such as the present invention, depending on the application. The message or deciphered message is then hashed 19B, by an identical hash function as employed in 19A, and blocked 20B into the terms $\{y_1, y_2, \ldots, y_{m'}\}$.

The signature checking subsystem 17 tests whether there is some d congruent modulo q to a value in the range $[-1, [Q/P]+1]$ such that $y \equiv y' + dg$ mod q, where $$q = \prod_{j=1}^{m'} q_j,$$

$y \equiv \{y_1, y_2, \ldots, y_{m'}\}$ mod $\{q_1, q_2, \ldots, q_{m'}\}$, $y' \equiv \{y'_1, y'_2, \ldots, y'_{m'}\}$ mod $\{q_1, q_2, \ldots, q_{m'}\}$, $d \equiv \{d_1, d_2, \ldots, d_{m'}\}$ mod $\{q_1, q_2, \ldots, q_{m'}\}$, and $g \equiv \{g_1, g_2, \ldots, g_{m'}\}$ mod $\{q_1, q_2, \ldots, q_{m'}\}$. The value of d can be calculated as $d \equiv g^{-1}(y'-y)$ mod q. Alternatively, the verifier can check all values of d in the range $[-1, [Q/P]+1]$. If $Q < 2P$, then testing $y_j \equiv y'_j \pm g_j$ mod $q_j$, for $j=1$ to $m'$, is sufficient to verify the signature. The result of the checking subsystem 17 is a true/false authenticity determination that indicates whether the message was truly sent by party A as claimed by the sender.

Signatures do not require $Q > P$ as is necessary for enciphering messages. However, selecting $Q < P$ will cause further redundancy in the signature. Selecting $P < Q$ will result in an abbreviated signature although abbreviation is not always recommended because of security restrictions. The range of d increases with abbreviation, which reduces the effective length of the signature, so we recommend $t > 130 + \log_2[Q/P]$ to prevent birthday attacks, where $t = \log_2 q$ and $\partial$ is a security margin of about 100 bits. Also abbreviation reduces k, where $$k = \sum_{i=1}^{n} s_i,$$

and Stern and Toffin's attack requires that $t < k - \partial/n$.

A deviation by dg, where $d < [Q/P]$, occurs between y and y' because information is lost during signature generation when $yw^{-1}$ mod Q is reduced modulo P with $P < Q$. A deviation of $\pm g$ in checking subsystem 17 may occur even with $Q < P$ because the estimation of $A_x$ during encoding is accurate to $2^{-e}$ with an error bounded by $[-2^{-e-1}, 2^{-e-1}]$. The $\pm g$ correction does not significantly affect the delay for signature checking or the security. For signatures of a message by multiple parties as described below, the $\pm g$ correction will significantly increase the verification delay unless the required corrections are determined by each signing party and appended to the signature. Several techniques for eliminating the $\pm g$ correction are described next although this elimination is not necessary.

The $\pm g$ correction can avoided by calculating b according to the relation $$b \equiv |w^{-1}(|w'^{-1}y|_q + cq)|_P$$

where $y \equiv \{y_1, y_2, \ldots, y_{m'}\}$ mod $\{q_1, q_2, \ldots, q_{m'}\}$ and c is a secret integer randomly selected from $[P2^{-e}/q, P/q)$ (or from $[P2^{-e-1}/q, P(1-2^{-e-1})/q)$ if $$A_x = \left[\sum_{i=1}^{n} x_i f_i\right]).$$

Then the estimate of $A_x$ will be exact if $A_x$ is accurate to $2^{-e}$ before truncation. Then the signature checking subsystem does not have to check for a deviation of $\pm g_j$. Alternatively, the sender can perform repeated signature generation trials with decoder 31 to eliminate the need for the $\pm g$ correction (by encoding the signature and if a $\pm g$ correction is needed, then signature generation is repeated with new randomly assigned residues $\{y_{m'+1}, y_{m'+2}, \ldots, y_m\}$).

If the key-set is designed specifically for signatures (and will not be used for enciphering messages), then the deviation by $\pm g$ can be avoided by selecting $P > Q(1+2^{-e})$ and calculating $A_x$ during encoding as $$A_x = \left[2^{-e-1} + \sum_{i=1}^{n} x_i f_i\right]$$

(now $2^{-e-1}$ is added before truncation instead of being subtracted). Then the truncated fraction of $A_x$ is bounded by $[0.0, (Q+2^{-e})/P)$ during encoding for signature checking because the truncated fraction of $A_x$ is an estimate of $(wb$ mod $P)/P$ and $wb$ mod $P \in [0.0, Q)$ is ensured during signature generation. This results in $$\sum_{i=1}^{n} x_i |wb_i|_P - A_x P \in [0.0, Q+2^{-e}) \in [0.0, P)$$

so $A_x$ and the (disguised) reduction mod P are exact during encoding for signature checking and will match the complete reduction mod Q that occurs during decoding for signature generation.

If H different parties sign the same message of size t bits with their own decoding key, then the total size of all the signatures is Hk, where k=ns. This multiple-party signature can be compacted as described next. The first party signs the message as normal. The second party signs any t bits from the signature of the first party, where t=logq and $$q = \prod_{j=1}^{m'} q_j$$

(all parties have the same value of q). The k−t bits from the first party, that are not signed by the second party, are appended to the signature of the second party. The third party then signs any t bits from either the signature of the second party or the k−t bits appended from the signature of the first party. This process can be extended to H parties and the total signature size is reduced to H(k−t)+t.

A larger block size may be needed for signatures than for secret messages to compensate for attacks based on the redundancy in the signature. There are $t - \log_2[Q/P]$ bits representing the message (or hash function of the message) and $ns - t + \log_2[Q/P]$ bits redundancy in the signature of ns bits, where t=log$_2$q and $$q = \prod_{j=1}^{m'} q_j.$$

Abbreviation does not reduce the redundancy in the signature because $ns + \log_2[Q/P]$ remains the same. The nonlinear term $A_x$ has about s bits and for secure signatures we recommend $s > \partial + ns - t + \log_2[Q/P]$, where $\partial$ is a security margin of about 80 bits, to prevent an attacker from transforming the nonlinear encoding problem to a less secure linear knapsack.

Figure 7:
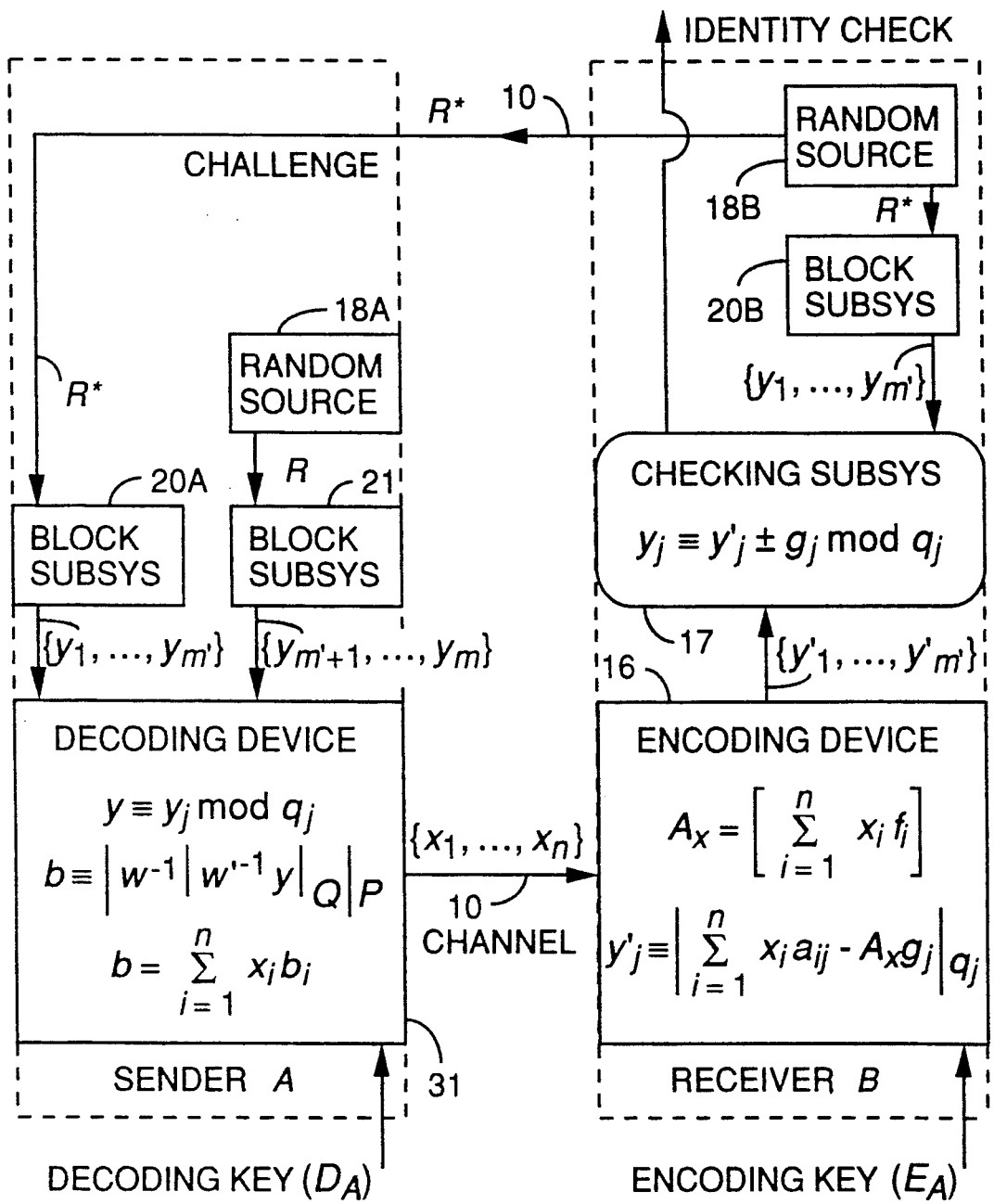
FIG. 7 shows in block diagram form, an embodiment of the system of FIG. 6 adapted to verify the identity of a candidate using the present public-key cryptosystem.

FIG. 7 shows in block diagram form a cryptographic identification system in accordance with the present invention, which can be used for access control. In FIG. 7, party B checks the identity of party A by challenging A to sign a random (or pseudorandom) value R* according to the signing procedure of FIG. 6. Only the true A will know the private key of A and be able to correctly sign the random number. A random value R* is generated by Terminal B with a random number generator 18B and sent to terminal A. The random value R* then replaces the hash value M of the message in the signing procedure of FIG. 6. The signature $\{x_1, x_2, \ldots, x_n\}$ can be checked by B or any third party by encoding with an encoder 16 and the public-key $E_A$ of party A. Checking subsystem 17 compares the encoded signature $\{y'_1, y'_2, \ldots, y'_{m'}\}$ with $\{y_1, y_2, \ldots, y_{m'}\}$, where the random value R* is blocked by subsystem 20B into $\{y_1, y_2, \ldots, y_{m'}\}$. The identity verification signal is a true/false indicator that tells party B whether the candidate is truly A as claimed by his/her identification string.

Figure 8:
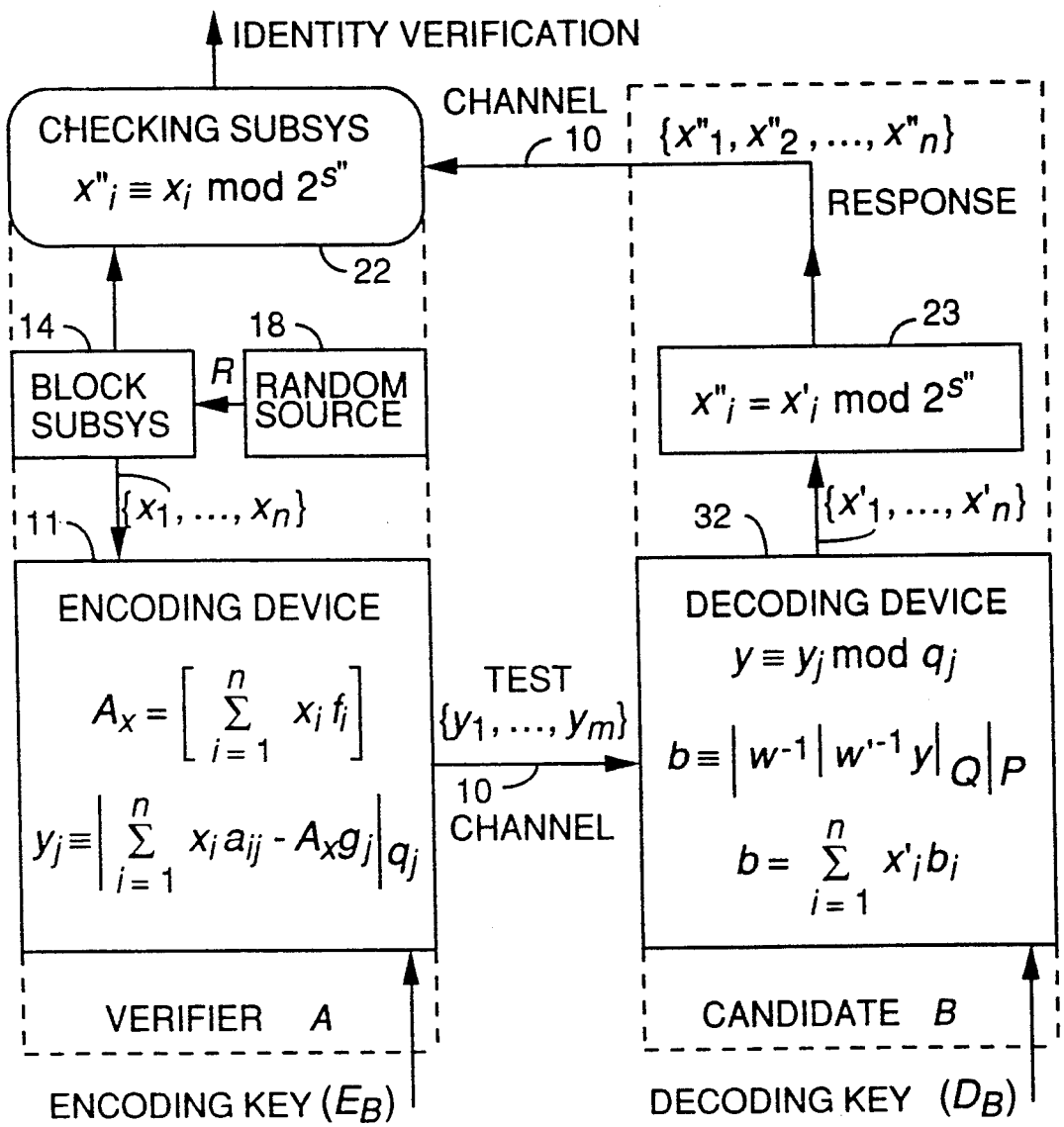
FIG. 8 shows in block diagram form, an embodiment of the system of FIG. 2 adapted to verify the identity of a candidate using the present invention.

FIG. 8 shows in block diagram form an alternative embodiment of a cryptographic identification system in accordance with the present invention. In FIG. 8, the verifier A encodes 11 a random (or pseudorandom) number R generated by random source 18 and challenges the candidate B to decode 32 the resulting ciphertext $\{y_1, y_2, \ldots, y_m\}$. Only the true B will know the private decoding-key of party B and be able to decrypt the challenge. Candidate B can only partially reveal each deciphered message residue to prevent a chosen ciphertext attack on the secret initial weights $\{b_1, b_2, \ldots, b_n\}$ of party B. In the exemplary case illustrated in FIG. 8, the candidate B calculates $\{x''_1, x''_2, \ldots, x''_n\}$ with subsystem 23 according to the relation: $x''_i = x'_i$ mod $2^{s''}$, for i=1 to n, where the decrypted ciphertext is equal to $\{x'_1, x'_2, \ldots, x'_n\}$, $s'' < s - \partial$, and $\partial$ is a security margin of about 80 bits. The checking subsystem 22 of party A compares $x''_i$ with $x_i$ mod $2^{s''}$, for i=1 to n.

In alternative embodiments of FIG. 8, the candidate may respond with $x''_1 = x'_1$ mod $2^{s_1}$ and the verifier checks if $x''_1 = x'_1$, where $s_1 > \partial$ and $n \geq 2$. Then computation may be saved by decoding only $x'_1$. In other alternative embodiments of FIG. 8, $\{b_1, b_2, \ldots, b_n\}$ may be chosen as powers of two for ease of implementation; selecting $\{b_1, b_2, \ldots, b_n\}$ with secret random numbers may increase the security but is not essential considering presently known attacks. Then the candidate reveals $x'_i$ mod $2^{s_i}$, for i=1 to n', where n' < n to prevent a chosen-ciphertext attack on P. In all embodiments of FIG. 8, the candidate may refuse to respond if $x'_i > 2^{s_i}$, for any $i \in [1, n)$, because this can not occur with a legitimate challenge and may be caused by a chosen-ciphertext attack.

Signature generation with the present invention is illustrated next with a small example, where n=2, k=10, and s=k/n=5. First the private decoding and public encoding keys are generated for party A:

Let $\{b_1, b_2\} = \{1, 32\}$
Let $P = 1221$, $w = 845$, $w^{-1}$ mod $P = 302$,
Let $q = 256$, $w' = 73$, $|w'^{-1}|_q = 249$,
Public-key for signatures:
$a_i = |w_1^{-1}|wb_i|P|_q$, for $i = 1$ to $n$, $\{a_1, a_2\} = \{245, 194\}$ $$f_i = \frac{wb_i \bmod P}{P}, \{f_1, f_2\} = \{0.69, 0.15\},$$

$g = w'P$ mod $q = 45$, $q = 256$

Next a signature is created for a message represented by 217 (or a hash value of 217) with the private decoding-key of the sender A:

$y = 217$ mod 256;
Let $c = 4$; $c$ is randomly chosen from
$[P2^{-e-1}/q, P(1 - 2^{-e-1})/q) = [1, 5)$,
where $e = 7 - s - \log n = 1$ because the fractions
$f_i$ are accurate to $2^{-7}$.
$|w'^{-1}y|_q + cq = (249 \cdot 217$ mod $256) + 4 \cdot 256 = 1041$
$b = w^{-1} \cdot 1041$ mod $P = 585$
Solving a superincreasing series with target value $b$ and weights $\{1, 32\}$:
$x_2 = [585/32] = 18$, $x_1 = 585 - 18 \cdot 32 = 9$
Then the signature is $\{9, 18\}$
(try another $c$ if $x_i \leq 2^s$, for any $i \in [1, n)$).

Then the signature of $\{9, 18\}$ is checked by party B with the public key of the sender A:

$$A_x = \left[ \sum_{i=1}^{n} x_i f_i \right] = [9 \cdot 0.69 + 18 \cdot 0.15] = 8$$

$$y = \left| \sum_{i=1}^{n} x_i a_i - A_x g \right|_q =$$

-continued $$9 \cdot 245 + 18 \cdot 194 - 8 \cdot 45 \bmod 256 = 217$$

The original message (or hash value) of 217 was returned so the signature is valid. Next, secret message enciphering is illustrated with the public encoding and private decoding keys of party A (i.e. party B will send an enciphered message to party A). In a secure network, each party has a unique key set. First, party A expands their public-key so that the knapsack weights, $a_{ij} \equiv w'(-wb_i \bmod P) \bmod q_j$, for $i=1$ to n and $j=1$ to m, are expressed with respect to two ciphertext moduli $\{q_1, q_2\} = \{256, 9\}$, where $q_1$ is public, $q_2$ is secret, $m'=1$, and $m=2$. To ensure all messages can be recovered, we select $Q = q_1 q_2 \geq (1+2^{-e})P$, where $e=1$.

Let $\{q_1, q_2\} = \{256, 9\}$ so $Q = 2304$.
Let $\{w_1', w_2'\} = \{73, 5\}$, $\{w_1'^{-1}, w_2'^{-1}\} \bmod \{q_1, q_2\} = \{249, 2\}$
Public-key mod $\{q_1, q_2\}$: $a_1 = \{245, 4\}$, $a_2 = \{194, 8\}$, $g = \{45, 3\}$,
$f_i = \{0.69, 0.15\}$, $q = 256$ Next, party B encodes a binary message 1011000110 with the public encoding key of party A:

Assigning message: $1011000110 \rightarrow \{10110, 00110\} = \{22, 6\}$

Encryption: $A_x = \left[ -2^{-e-1} + \sum_{i=1}^{n} x_i f_i \right] =$ $$[-0.25 + 22 \cdot 0.69 + 6 \cdot 0.15] = 15$$

$$y_1 = \left| \sum_{i=1}^{n} x_i a_{i1} - A_x g_1 \right|_{q_1} =$$

$$22 \cdot 245 + 6 \cdot 194 - 15 \cdot 45 \bmod 256 = 247$$

$$y_2 = \sum_{i=1}^{n} x_i a_{i2} - A_x g_2 = 22 \cdot 4 + 6 \cdot 8 - 15 \cdot 3 = 91$$

Then party A deciphers the ciphertext $\{247, 91\}$ with the private decoding-key of party A:

$y \equiv \{247, 91\} \bmod \{256, 9\}$:
$y' \equiv w'y^1 \bmod \{256, 9\} =$
$\qquad 249, 2\} \cdot \{247, 91\} \bmod \{256, 9\} = \{63, 2\}$
$y' = q_2 |(y_1' - y_2')q_2^{-1}|_{q_1} + y_2' = 9|(63-2)57|_{256} + 2 = 1343$
$b \equiv w^{-1} \cdot y' \bmod P \equiv 302 \cdot 1343 \bmod 1221 = 214$
$x_2 = [214/32] = 6, x_1 = 24 - 6 \cdot 32 = 22$ The message of $\{22, 6\}$ was returned.

In alternate embodiments, the public-key of the present invention can be shortened for signatures by using $n=1$ (secret messages require $n \geq 2$). With $n=1$, the signature is $x \in [0, 2^s)$ and the public key is $a_1 \equiv w'w \bmod q_1$, $f_1 = w/P$, and $g_1 \equiv w'P \bmod q_1$. The signature is encoded according to $y'_1 \equiv xa_1 - [xf_1]g_1 \bmod q_1$. The larger nonlinear term $A_x$ of $s$ bits with $n=1$ relative to the redundancy in the signature of $s - \log q_1$ bits permits a smaller block size and public key than with $n \geq 2$.

In still other embodiments, the public-key of the present invention can be shortened by standardizing some of the variables in the public-key for all parties in a network. There are still the same number of possible private keys for a given public key; the number of possible public keys is reduced but is still very large. With presently known cryptanalytic attacks, the block size does not need to be expanded when the public-key is partially standardized. The encoding and decoding function are unchanged but all the users have a public-key that is identical in part.

In an exemplary case, let part of the public-key: $\{q_1, q_2, \ldots, q_{m'}\}$, $\{g_1, g_2, \ldots, g_m\}$, and $\{a_{v1}, a_{v2}, \ldots, a_{vm}\}$, where $v$ takes on one of the values in the range $[1, n)$, be standardized to values from their specified ranges. The standard values of $a_{vj}$ and $g_j$, for $j=1$ to $m$, can be randomly chosen from $[2^{s-1}, 2^s)$, where $2^s \leq q_j$ (the lower limit of $2^{s-1}$ is included because small values weaken the encoding problem). Alternatively, certain bit patterns can be chosen for reasons of security or implementation from $[2^{s-1}, 2^s)$. Then part of the private key: $\{b_1, b_2, \ldots, b_n\}$, P, and $\{q_{m'+1}, q_{m'+2}, \ldots, q_m\}$, is secretly selected as usual. Next, the rest of the private key, w and w', is calculated according to the relations: $w' \equiv P^{-1}g \bmod Q$ and $w \equiv |b_v^{-1}|w'^{-1}a_v|_Q|_P$ where $a_v \equiv \{a_{v1}, a_{v2}, \ldots, a_{vm}\} \bmod \{q_1, q_2, \ldots, q_m\}$ and $g \equiv \{g_1, g_2, \ldots, g_m\} \bmod \{q_1, q_2, \ldots, q_m\}$. A large value of $v$, such as $v=n$, is more secure because $b_n$ is the largest and contains the most secret information. The rest of the public weights $a_{ij}$, for $i=1$ to $v-1$ and $i=v+1$ to n, and $j=1$ to m, and $f_i$, for $i=1$ to n, are then chosen as usual and are not standardized.

The present invention satisfies both the secrecy and authenticity requirements of a public-key cryptosystem, as does RSA, but does so with about one hundred times less computation for encoding and decoding than RSA. Numerous security protocols for the secret and/or authentic exchange of information have been proposed that involve public-key cryptosystems and the present invention can meet the requirements and specifications of such protocols. Many applications of public-key cryptosystems using such protocols are known in the prior art such as secure telecommunications and banking (an overview of public-key cryptography is given in "Contemporary cryptology, the science of information integrity", IEEE press, 1992).

Encoding with the present invention involves a double-iterated modular multiplication: $w \bmod P$ and $w' \bmod Q$. Conventional knapsacks, as well as the present invention, choose P according to the small sum principle:

$$P > \sum_{i=1}^{n} b_i(2^s - 1),$$

to prevent overflow mod P and ensure correct decoding. However, conventional knapsacks also select Q according to the small sum principle:

$$Q > \sum_{i=1}^{n} x_i |wb_i|_P.$$

In contrast, the present invention is designed such that $$\sum_{i=1}^{n} x_i |wb_i|_P - A_x P \in [0, Q)$$

(we call this the large sum principle). The nonlinear coefficient $A_x$ corrects for the overflow mod P that occurs when the message terms are combined during encoding, which permits a smaller Q relative to P than the small sum principle.

To ensure a high level of security in such systems, a party's decoding key is not practically determinable from their public encoding key. The security of the private key (i.e. the secrecy of the trapdoor embedded in the encoding problem) depends in part on the difficulty of reconstructing the knapsack weights from the Q residue number system, where $\{q_{m'+1}, q_{m'+2}, \ldots, q_m\}$ are secret. As well, attacks on the trapdoor of knapsacks by simultaneous diophantine approximation (as reviewed by Brickell and Odlyzko) take advantage of the small sum principle, which is not followed by the present invention.

The present public-key cryptosystem is most closely related to the Merkle-Hellman or Goodman-McCauley (described in "New trapdoor knapsack public key cryptosystem", IEE Proceedings, 1985) knapsack public-key cryptosystems although both were broken (as reviewed by Brickell and Odlyzko). One difference between the present invention and the many broken knapsack cryptosystems is that conventional knapsack cryptosystems follow the small-sum principle for each iteration of modular multiplication, whereas the present invention follows the present large-sum principle except for the first iteration. A second difference is that the present invention includes the extra step of representing the knapsack weights in a residue number system with partially secret moduli. Some previously proposed knapsack cryptosystems, such as the Goodman and McCauley scheme, have mapped the message to a residue number system with secret moduli (the present invention can also employ this technique in an alternate embodiment) but those schemes did not express the knapsack weights and ciphertext in a residue number system with secret moduli and, as a result, can not be securely used as a public-key cryptosystem. The various definitions of the initial weights $\{b_1, b_2, \ldots, b_n\}$, as employed by the broken knapsacks, can also be employed with the present invention as alternate embodiments.

The security of this cryptosystem requires that at least one of the moduli $\{q_1, q_2, \ldots, q_m\}$ be kept secret (i.e. $m > m'$) to prevent recombination of the public residues of the knapsack weights. The moduli in the Q residue number system can have different sizes (in terms of number of bits). As well, at least one of the moduli $\{q_1, q_2, \ldots, q_m\}$ is recommended to be public (i.e. $m' \geq 1$) when sending secret messages because the amount of information in the ciphertext is reduced if $\{y_1, y_2, \ldots, y_{m'}\}$ are reduced by $\{q_1, q_2, \ldots, q_{m'}\}$ during encoding although this may not be essential. Fast signature checking also requires that $\{q_1, q_2, \ldots, q_{m'}\}$ be public.

The security of a public-key cryptosystem also requires that the message is not practically discernible from the ciphertext without the secret decoding key (the encoding function is called a trapdoor one-way function by Diffie and Hellman). Decoding a ciphertext created by the present invention without the decoding key involves solving a compact knapsack problem including a nonlinear term $A_x g$, that is a nonlinear function of the message (the nonlinear operation is the truncation of $A_x$). Linear compact knapsacks, with large coefficients and few weights, are less secure than linear knapsacks with [0, 1] coefficients and many weights. The present encoding function is designed to create a large nonlinear coefficient $A_x$, which thwarts cryptanalytical attacks that are successful against linear compact knapsacks such as integer programming or lattice basis reduction (these attacks are reviewed by Brickell and Odlyzko). Linear knapsack cryptosystems require a public-key in the tens of kilobits, which is a limitation for a large number of parties. The present invention has a public-key in the hundreds of bits because the nonlinear term permits fewer knapsack weights to be used for the same security level.

The present invention uses $[0, 2^s)$ coefficients so the degree of compaction increases with s. The public-key size of roughly $(n+r)ns$ bits decreases with n. Conventional knapsack cryptosystems need at least $ns = 100$ to prevent enumeration attacks on the knapsack problem (see R. Schroeppel and A. Shamir, "A $TS^2 = O(2^n)$ time/space tradeoff for certain NP-complete problems", in Proceedings IEEE 20th Annual Symposium Foundations Computing Science, 1979). Enumeration can also be applied to the present cryptosystem, so we recommend $ns > 2\partial$ for secret messages and $t > 2\partial$ for signatures, where $\partial$ is a security margin of about 100 bits. For identification or signatures, where the candidate is time or resource limited (such as smart card identification), $t > \partial$ is sufficient.

The security depends in part on the size of the nonlinear term of s bits relative to the block size of ns bits. Smaller values of n increase this ratio. However, the encoding function contains a compact knapsack (as well as the nonlinear term) and the security of a compact knapsack increases with n. A larger nonlinear term can be generated for signatures without decreasing n by assigning $x_i \in [0, 2^{s_i})$, where $f_i$, for $i=1$ to n, are published to $s_i + \log_2 n + e$ bits precision. The size of message terms has to be constant with $x_i \in [0, 2^s)$ because the most significant bits of the largest message term would be revealed by an unreduced ciphertext residue.

A consequence of the nonlinear term and the associated fractions $\{f_1, f_2, \ldots, f_n\}$ that are part of the public key is that a chosen ciphertext attack to find the secret constants P or $\{b_1, b_2, \ldots, b_n\}$ can be successful if not counterbalanced. This chosen ciphertext attack requires that all of the ciphertext residues $\{y_1, y_2, \ldots, y_m\}$ be chosen and all of the deciphered message terms $\{x'_1, x'_2, \ldots, x'_n\}$ be fully revealed. However, there are several standard ways to ensure that a chosen ciphertext attack is infeasible such as checking standard data fields in each deciphered message block (and destroying the deciphered message if the signature is invalid), or including random data fields in each message residue that are discarded upon decryption. In the case of signatures, random data are assigned to residues $\{y_{m'+1}, y_{m'+2}, \ldots, y_m\}$ so a chosen ciphertext attack is thwarted. As well, a chosen ciphertext attack is infeasible for secret distribution of keys for other cryptosystems because the distributed-key is kept secret and not revealed.

The present invention can permit both secret and signed messages with one key set (consisting of an encoding key and a decoding key). Also the present public-key cryptosystem can be employed in a form that only permits secret messages by keeping all or most of the moduli $\{q_1, q_2, \ldots, q_m\}$ secret and a smaller block size is possible than if signatures were included. As well, the present invention can be employed in a form that only permits signatures by making moduli $\{q_1, q_2, \ldots, q_{m'}\}$ public but not publicly disclosing $a_{ij}$ and $g_j$, for $i=1$ to n and $j = m'+1$ to m. Two separate key sets (one for secrecy and one for authenticity) may be more practical than a combined key set.

The security of public-key cryptosystems can not be proven. Some guidelines are given below for selecting the block size and cryptosystem parameters so that all the cryptanalytical attacks known at present are infeasible. Other parameter selections are possible in keeping with the present invention; in general, there is a tradeoff between security and performance in terms of speed, public-key size, message expansion, and signature size.

The cryptosystem parameters can be expressed in terms of some multiple of $\partial$ bits, where the fastest known attack requires $2^\partial$ repetitions and each repetition takes at least one clock cycle. Then $\partial$ can be selected to achieve the desired security level; for example, $\partial=50$ provides minimal security and $\partial=100$ has a high level of security with today's computers. The following guidelines are suggested to implement this invention (with $r=2$ iterations of modular multiplication as described so far, $P=p^{r-1}$ and $Q=p^r$):

Signatures and secret messages

1. $1 \leq m' < m$.
2. $m \geq 2$.
3. $r \geq 2$.
4. $t < \log_2(p^{r-1}) - \partial/n$ to neutralize Stern and Toffin's attack, where $$t = \sum_{j=1}^{m'} \log_2 q_j.$$

Signatures

5. $n \geq 1$
6. $s_{max} > k - t + \log_2[p^{k'+1}/p^{k'}] + \partial$ to prevent presetting of $A_x$ with $k - t + \log_2[Q/P]$ bits redundancy in the signature, where $s_{max} = \log_2 x_{max}$, $x_{max} = \max\{x_1, x_2, \ldots, x_n\}$, $$k = \sum_{i=1}^{n} s_i,$$

and $p^{k'}$ is the only ring of integers with $p^{k'+1} > p^{k'}$ (the index $k'$ is not related to the block size k).

7. $s^*_{max} > \partial$, where $s^*_{max}$ is $s_{max}$ after presetting any $k - t + \log_2[p^{k'+1}/p^{k'}]$ bits in the signature $\{x_1, x_2, \ldots, x_n\}$.
8. $t < \log_2 p^r - \partial/2$ to prevent recombination of the weights.
9. $t > 128 + \log_2[p^{k'+1}/p^{k'}]$ to counter birthday attacks on signatures (see also guideline 10) and $t > \partial + \log_2[p^{k'+1}/p^{k'}]$ for signature-based identification.
10. $t > 2\partial$ to counterbalance enumeration attacks on the encoding problem.
11. $t < \log_2 p^{r-1} - \partial/2$ to foil an unwinding attack on the trapdoor.

Secret messages

12. $n \geq 2$.
13. $t < \log_2 p^r - \partial$ to prevent recombination of the weights.
14. All $\{x_1, x_2, \ldots, x_n\}$ have s bits for secret messages so that most significant bits of the largest message residue is not revealed by unreduced ciphertext residues.
15. $(m-m')s < k - \partial$ for secret messages to thwart a linear approximation of the encoding problem.
16. Standard or random bits may be included to counter a chosen ciphertext attack.
17. $k > 2\partial$ to block enumeration attacks on the encoding problem.

More conservative guidelines may be needed in keeping with the present invention depending on the success of future cryptanalysis (i.e. may need to increase the minimum values or change the ratios of $\partial$, n, r, m, s, t, and k−t). Alternate selections of the initial weights $\{b_1, b_2, \ldots, b_n\}$ (as described below) may provide higher security but may also result in a larger public-key or extra message expansion.

A small public-key is valuable for a large numbers of parties and this is achieved by decreasing n and r although the security of the encoding problem increases with n and r. Table 1 suggests cryptosystem parameters in terms of $\partial$ for the smallest possible values of n and r (i.e. $r=2$ and $n=1$ or $n=2$), which satisfy the above guidelines and lead to the smallest public-key. Parameter selections for larger n or r are also possible, which satisfy the guidelines. Several modes of operation are described in the table: signature-only or secret-messages-only or combined signatures-and-secret-messages in one cryptosystem. The corresponding public key size is also indicated in terms of $\partial$. With $m=2$, there is only one public modulus $q_1$ of t bits so the secret modulus $q_2$ has about k−t bits, where k=ns bits is the message block size.

TABLE 1

Parameter selection for the present invention with $m' = 1$, $m = 2$, $r = 2$, and $n = 1$ or 2.

| Mode | n | k bits | $s_{max}$ bits | t bits | Public-key bits |
|---|---|---|---|---|---|
| identity | 1 | $2\partial$ | $2\partial$ | $\partial$ | $\partial$ |
| signature | 1 | $130 + \partial$ | $130 + \partial$ | 130 | 130 |
| secrecy | 2 | $2\partial$ | $\partial$ | $\partial$ | $4\partial$ |
| signature | 2 | $5\partial/2$ | $3\partial/2$ | $2\partial$ | $4\partial$ |
| secrecy/sign. | 2 | $4\partial$ | $2\partial$ | $3\partial$ | $8\partial$ |

The first row corresponds to a signature-based identification scheme as in FIG. 7. Any of the signature or secrecy schemes can also be used for identification according to FIG. 7 or FIG. 8 respectively. The fifth row permits signatures and secret messages with a single private and public key pair.

The amount of computation for the present invention is roughly equivalent to $1+r/2$ multiplies of k by k bits for encoding and r multiplies for decoding regardless of n (2 multiplies is sufficient for decoding regardless of r with an alternate decoding technique). Computation is minimized with $m'=1$, $q_1=2^t$, $b_1=1$, and $b_2=2^s$. In contrast, RSA encryption requires the equivalent amount of computation as 34 multiplies of k by k bits with $k=500$ (assuming a small public RSA exponent of $2^{16}+1$ and that one modular multiplication is equivalent to two multiplications) and 250 k by k bit multiplies for decryption modulo p and q (the secret RSA factors). RSA has a public-key of at least $k=500$ bits (or $5\partial$ if $\partial=100$). Thus the public key size of the present invention and RSA are of the same order of magnitude (assuming $\partial=100$) but there are several orders of magnitude less computation with the present invention.

If a small public-key size is of primary importance, then a hybrid cryptographic communication scheme can be composed of the $n=1$ signature scheme in conjunction with the Diffie-Hellman key-distribution scheme (which has no user-dependent public-key) plus a conventional single-key (private-key) cryptosystem for secret messages resulting in a total public-key of about 130 bits. An alternative hybrid cryptosystem that has less computation than the Diffie-Hellman scheme for key-distribution includes the $n=1$ signature-only scheme and the n=2 secret-messages mode for key-distribution plus a conventional single-key cryptosystem for secret messages resulting in a total public-key of $4\partial+130$ bits.

In alternate embodiments, the initial knapsack weights $\{b_1, b_2, \ldots, b_n\}$ can formed from a superincreasing series with interwoven non-superincreasing bands as proposed for the broken Graham-Shamir and Willet knapsack cryptosystems, which are otherwise similar to the broken Merkle-Hellman cryptosystem. First, a superincreasing series $\{d_1, d_2, \ldots, d_{n'}\}$ is selected according to $$d_j > \sum_{i=1}^{j-1} d_i(2^{s_i} - 1)$$

and $$P > \sum_{i=1}^{n'} d_i(2^{s_i} - 1).$$

An exemplary selection is $d_i = 2^{(i-1)s}$, for $i=1$ to $n'$, where $s_i = s$. Next, $\{d_1, d_2, \ldots, d_{n'}\}$ is divided into two subsets S and S*, where S contains any n elements from $\{d_1, d_2, \ldots, d_{n'}\}$, S* contains the remaining n" elements, and $n' = n + n''$. Then the initial knapsack weights $\{b_1, b_2, \ldots, b_n\}$ are calculated as $$b_i = d_j + \sum_{\substack{k \in S^* \\ all\ k}} r_{ik} d_k,$$

for $i=1$ to n, where $d_j \in S$, a different value of $d_j$ from subset S is used with each $b_i$, and $r_{ik}$ is randomly selected from $[0, 2^{s_i}/n)$, for all $d_k \in S^*$. The rest of the encoding and decoding key can now be generated with $n \geq 1$, $r \geq 2$, and the partially-superincreasing initial-weights $\{b_1, b_2, \ldots, b_n\}$ according to the same relations that are employed if $\{b_1, b_2, \ldots, b_n\}$ is a superincreasing series. The message-to-be-enciphered is assigned to $x_i \in [0, 2^{s_i})$, for $i=1$ to n. Decoding is performed by solving a superincreasing series with weights $\{d_1, d_2, \ldots, d_{n'}\}$ and target value b and the deciphered message $\{x'_1, x'_2, \ldots, x'_n\}$ corresponds to the subset S of $\{d_1, d_2, \ldots, d_{n'}\}$. The non-superincreasing bands may counter some presently-unknown attacks but the message expansion increases along with the average number of signature generation trials $P/2^{ns}$.

In other embodiments, the generalized form of the Chinese remainder theorem used in the broken Goodman-McCauley cryptosystem can be employed to form a set of initial knapsack weights $\{b_1, b_2, \ldots, b_n\}$ in the ring of integers modulo P with the present invention. The Goodman and McAuley cryptosystem is a generalization of the broken public-key cryptosystem of S. C. Lu and L. N. Lee described in "A simple and effective public-key cryptosystem", COMSAT technical review, 1979, pp. 15-24.

First, a residue number system is selected with n pairwise relatively prime moduli $\{p_1, p_2, \ldots, p_n\}$ that are randomly chosen from the interval $p_i \in [2^d, 2^d + v)$, for $i=1$ to n, where d and v are positive integers. The initial ring of integers modulo P then becomes $$P = \prod_{i=1}^{n} p_i.$$

Next, the matrix b is selected, where $$b = \begin{pmatrix} b_{11} & b_{12} & \ldots & b_{1n} \\ b_{21} & b_{22} & \ldots & b_{2n} \\ \cdot & \cdot & & \cdot \\ \cdot & \cdot & & \cdot \\ \cdot & \cdot & & \cdot \\ b_{n1} & b_{n2} & \ldots & b_{nn} \end{pmatrix},$$

and the values of $b_{ij}$, for $i=1$ to n and $j=1$ to n, are randomly chosen from the range $b_{ij} \in [0, 2^z)$ such that the matrix b is nonsingular and invertable and the sum of each column of b is less than $2^z$ (i.e.

$$\sum_{j=1}^{n} |b_i|_{p_j} < 2^z,$$

for $i=1$ to n), where $nz > \partial$ and $\partial$ is a security margin of about 100 bits.

The initial knapsack weights $\{b_1, b_2, \ldots, b_n\}$ are then defined by the relation $b_i \equiv \{b_{i1}, b_{i2}, \ldots, b_{in}\}$ mod $\{p_1, p_2, \ldots, p_n\}$ and the residues $\{b_{i1}, b_{i2}, \ldots, b_{in}\}$ may be recombined by the Chinese remainder theorem according to the relation $$b_i = \left| \sum_{j=1}^{n} b_{ij} P_j |P_j^{-1}|_{p_j} \right|_P$$

where $P_j = P/p_j$. The rest of the encoding and decoding key can be generated with $n \geq 2$, $r \geq 2$, and the initial weights $\{b_1, b_2, \ldots, b_n\}$ specified by matrix b, according to the same relations that are employed if $\{b_1, b_2, \ldots, b_n\}$ is a superincreasing series. A message-to-be-enciphered is assigned to $\}x_1, x_2, \ldots, x_n\}$, where $x_i < 2^s$, for $i=1$ to n, and $d \geq s + z$. An encoded message is deciphered by first calculating $$x''_i \equiv |w^{-1}|w'^{-1}y|Q|_{p_i'}$$

for $i=1$ to n, with $r=2$, where $y \equiv \{y_1, y_2, \ldots, y_m\}$ mod $\{q_1, q_2, \ldots, q_m\}$. Then a matrix multiplication $x' = x'' \cdot b^{-1}$ is performed, where $x'' = (x''_1, x''_2, \ldots, x''_n)$ and the deciphered message is $x' = (x'_1, x'_2, \ldots, x'_n)$, which is congruent to the original message $\{x_1, x_2, \ldots, x_n\}$ modulo $\{p_1, p_2, \ldots, p_n\}$. The Lu-Lee and Goodman-McCauley cryptosystems depended in part on the difficulty of factoring P and so required $d > 200$ although this is not essential with the present invention.

The use of a generalized form of the Chinese remainder theorem in the initial knapsack of the present invention results in greater message expansion, which may be acceptable for brief secret messages but can significantly delay signature generation. The simpler form of the Chinese remainder theorem as employed by Davida, Wells, and Kam does not have further message expansion than a superincreasing series. With the simple form of the Chinese remainder theorem, the matrix b is selected as the identity matrix so $b_i = P_i(P_i^{-1} \bmod p_i)$, for $i=1$ to n. Then the encoded message is deciphered according to $$x'_i \equiv |w^{-1}|'^{-1}y|Q|_{p_i'}$$

for i=1 to n, with r=2. However, finding the factors of P (i.e. $p_i$, for i=1 to n) is easier than finding P with Stern and Toffin's attack. Consequently, we recommend t<s−∂ with r=2, which results in a larger block size than the usual condition, t<k−∂/n, of guideline 4. With r>2, guideline 4 can also be used with this simple form of the Chinese remainder theorem.

In still other embodiments, the form of the Chinese remainder theorem employed by Adiga and Shankar in the broken Modified Lu-Lee cryptosystem can be used to select the initial knapsack weights for the present invention. First, $\{b_1, b_2, \ldots, b_{n-1}\}$ are generated from the matrix b (now having dimensions n−1 by n−1) with the Chinese remainder theorem, where $b_{ij} \in [0, 2^s)$, for i=1 to n−1 and j=1 to n−1, $$P = \prod_{i=1}^{n-1} p_i,$$

and $p_i \geq 2^d$. Next, a further initial weight is included: $b_n = 1$.

Then the encoding and decoding keys are generated with the initial knapsack weights $\{b_1, b_2, \ldots, b_n\}$. The message is assigned to $x_n \in [0, 2^s)$ and random bits are assigned to $x_i \in [0, 2^z)$, for i=1 to n−1, where $d \geq s+z$. Decoding involves calculating $x' = x'' \cdot b^{-1}$, where $x' = (x'_1, x'_2, \ldots, x'_{n-1})$ are now rational numbers. Then the deciphered message is $$x'_n = x''_i - \sum_{j=1}^{n-1} ([x'_i] + u_i) b_{ij},$$

where i is one of the integers from the range [1, n−1] and $u_i = 0$ if $$\sum_{j=1}^{n-1} b_{ji}^{-1} \geq 0$$

(i.e. if the sum of the ith column of $b^{-1}$ is positive) and $u_i = 1$ otherwise. In the case of n−1=2, $u_i = 0$, for i=1 to 2, if $b_{12} > b_{22}$, and $b_{21} > b_{11}$.

In yet other embodiments, mixed-radix conversion can be employed to form an initial-knapsack in the P residue number system with n=2 for secret and signed messages. A message $\{x_1, x_2\}$ is combined by mixed radix conversion, $x \equiv p_1 | (x_2 - x_1) p_1^{-1} |_{p_2} + x_1$, in the ring of integers modulo P (this operation is disguised during encoding). The initial knapsack weights are selected as $\{b_1, b_2\} = \{1, p_1 | p_1^{-1}|_{p_2}\}$, and an encoding key is generated with n=2 and $r \geq 2$ (according to the same relations that are used if $\{b_1, b_2\}$ are superincreasing). A message-to-be-enciphered is assigned to $x_i \in [0, 2^s)$, for i=1 to 2, and $\{x_1, x_2 - x_1\}$ is encoded with the encoding-key. If $A_x$ is negative, which may occur if $x_2 - x_1$ is negative, then $A_x$ is rounded down (in weighted value, not absolute value) so that the large sum principle $$\sum_{i=1}^{n} x_i | wb_i |_P - A_x P \in [0, Q)$$

is still satisfied (for example, $A_x = [-1.3]$ is rounded down to $A_x = -2$). The encoded message is deciphered according to $$x'_i = |w^{-1}|w'^{-1}y|_Q|_{p_i},$$

for i=1 to 2, with r=2.

As described above, many alternate selections of the initial weights $\{b_1, b_2, \ldots, b_n\}$ are possible with the present invention. A superincreasing series is believed to provide the best combination of security and message expansion, which is directly related to the average number of signature generation trials. The choice of initial weights has less affect on the security with r>2 (as described below). Other choices of $\{b_1, b_2, \ldots, b_n\}$ may be employed with the present invention, provided that there is a practical method of recovering $\{x_1, x_2, \ldots, x_n\}$ from $$b = \sum_{i=1}^{n} x_i b_i \mod P,$$

and are intended to be embraced by the claims.

In yet still other embodiments, further iterations of modular multiplication can be included during key generation and the total number of iterations is r, where $r \geq 2$ (FIGS. 2, 3, 4, 6, 7, and 8 correspond to r=2 with modular multiplications by w mod P and w' mod Q). The initial weights $\{b_1, b_2, \ldots, b_n\}$ can be superincreasing or any of the alternate selections of the initial-weights can be employed in the first ring of integers.

In the following general notation, the first ring of integers modulo is called $p^0$ (this is equivalent to P with r=2) and the final ring of integers modulo $p^r$ (or Q with r=2) is a residue number system, where $$p^r = \prod_{j=1}^{m} q_j$$

and $\{q_1, q_2, \ldots, q_m\}$ are pairwise relatively-prime. With r iterations of modular-multiplication, the initial-weights are called $a_i^0 = b_i$, for i=1 to n, and the weights in the final ring of integers modulo $p^r$ are called $a_i^r$, for i=1 to n, where $n \geq 1$. The kth iteration of modular multiplication performs $$a_i^k \equiv w^k a_i^{k-1} \mod p^k,$$

for k=1 to r, where $w^k$ and $p^k$ are relatively prime, for k=1 to r, and $p^{k-1}$ and $p^k$ are pairwise relatively prime, for k=2 to r. A further nonlinear term appears in the encoding problem for each extra iteration of modular multiplication, which may increase the security against presently unknown attacks. Encoding with $r \geq 2$ is performed according to the relations $$y_j \equiv \sum_{i=1}^{n} x_i a_{ij} - \sum_{k=1}^{r-1} A_x^k g_j^k \mod q_j, \text{ for } j = 1 \text{ to } m',$$

and $$y_j = \sum_{i=1}^{n} x_i a_{ij} - \sum_{k=1}^{r-1} A_x^k g_j^k, \text{ for } j = m' + 1 \text{ to } m,$$

where $$A_x^k = \left[ -2^{-e-1} + \sum_{i=1}^{n} x_i f_i^k - \sum_{h=1}^{k-1} A_x^h f^{h,k} \right]$$

and $1 \leq m' < m$. The encoding-key contains the integers $a_{ij}$, $g_j^k$, and fractions $f_i^k$ and $f^{h,k}$, for i=1 to n, j=1 to m, $k=1$ to $r-1$, and $h=1$ to $k-1$, and $q_j$, for $j=1$ to $m'$, where $$a_{ij} \equiv a_i^j \bmod q_j,$$

$$f_i^k = \frac{a_i^k}{p^k},$$

$$f^{h,k} = \frac{p^{h,k}}{p^k},$$

$$g_j^k \equiv p^{k,r} \bmod q_j,$$

and $p^{h,k}$ is obtained by calculating $p^{h,h+1} \equiv w^{h+1} p^h \bmod p^{h+1}$, $p^{h,h+2} \equiv w^{h+2} p^{h,h+1} \bmod p^{h+2}$, ..., $p^{h,k} \equiv w^k p^{h,k-1} \bmod p^k$ ($p^{k,r}$ is calculated similarly and $p^{k,k} = p^k$).

If the initial weights $\{b_1, b_2, \ldots, b_n\} = \{a_1^0, a_2^0, \ldots, a_n^0\}$ are selected as a superincreasing series, then the following relations are satisfied $$b_j > \sum_{i=1}^{j-1} b_i(2^s - 1) \text{ and}$$

$$p^1 > \sum_{i=1}^{n} b_i(2^s - 1),$$

where $p^1$ is relatively prime to $b_i$, for $i=1$ to $n$. The rings of integers $p^k$, for $k=2$ to $r$, satisfy the large sum principle $$\sum_{i=1}^{n} x_i a_i^k - \sum_{h=1}^{k} a_x^h p^{h,k} \in [0, p^{k+1}),$$

which is ensured by selecting $$p^k > (1 + 2^{-e}) p^{k-1},$$

for $k=2$ to $r$, where $2^{-e}$ is the accuracy in the estimation of $A_x^k$ and the fractions $f_i^k$ and $f^{h,k}$, for $i=1$ to $n$, $k=1$ to $r-1$, and $h=1$ to $k-1$, are published to $s+\log_2(n)+k-1)+e$ bits precision, where $e$ is a positive number.

An enciphered message $\{y_1, y_2, \ldots, y_m\}$ is decoded by first calculating $$y^{k-1} \equiv y^k (w^k)^{-1} \bmod p^k,$$

from $k=r$ decrementing to 1, where $y^r \equiv \{y_1, y_2, \ldots, y_m\} \bmod \{q_1, q_2, \ldots, q_m\}$, and then solving a knapsack problem, $$b = \sum_{i=1}^{n} x_i' b_i$$

with superincreasing weights $\{b_1, b_2, \ldots, b_n\}$ and target value $b = y^0$, by calculating sequentially $$x_i' = \left[ \frac{b - \sum_{j=i+1}^{n} x_j' b_j}{b_i} \right],$$

from $i=n$ decrementing to 1, to return the deciphered message $\{x'_1, x'_2, \ldots, x'_n\}$. The decoding key includes the positive integers $\{b_1, b_2, \ldots, b_n\}$, $\{w_1, w_2, \ldots, w_r\}$, $\{p^1, p^2, \ldots, p^r\}$, and $\{q_1, q_2, \ldots, q_m\}$.

For signature checking with r iterations of modular multiplication, the signature verifier checks if $$y_j \equiv y_j' + \sum_{k=1}^{r-1} d^k g_j^k \bmod q_j,$$

for $j=1$ to $m'$, with $d^k \in [-1, [p^{k+1}/p^k]+1]$. If the key-set is designed for secret messages, as well as signatures, then $p^k > (1+2^{-e})p^{k-1}$ and the probability of a deviation by a multiple of $g^k$ approaches zero as the ratio of $p^{k+1}/p^k$ approaches unity as $e$ is increased.

The signature checking subsystem does not have to check for a deviation of $d^{r-1} g^{r-1}$ if the message (or hash value), assigned to $\{y_1, y_2, \ldots, y_{m'}\}$, and a secret random value $c$ (or any secret integers or a fixed-value) are combined according to the relation $$y^{r-1} = |(w^r)^{-1} y^r|_q + cq,$$

where $c \in [p^{-1} 2^{-e}/q, p^{r-1}/q)$, $$q = \prod_{j=1}^{m'} q_j,$$

and $y^r \equiv \{y_1, y_2, \ldots, y_{m'}\} \bmod \{q_1, q_2, \ldots, q_{m'}\}$. The subsequent steps of signature generation are completed with the above value of $y^{r-1}$. Then the signature is valid if $$y_j \equiv y_j' + \sum_{k=1}^{r-2} d^k g_j^k \bmod q_j,$$

for $j=1$ to $m'$, where $d^k \in [-1, [p^{k+1}/p^k]+1]$.

If the key-set is designed specifically for signatures (and will not be used for enciphering messages), then any deviations by a multiple of $g^k$, for $k=1$ to $r-1$, can be avoided by selecting $p^k > p^{k+1}(1+2^{-e})$ and calculating $A_x^k$ during encoding as $$A_x^k = \left[ 2^{-e-1} + \sum_{i=1}^{n} x_i f_i^k - \sum_{h=1}^{k-1} A_x^h f^{h,k} \right]$$

(now $2^{-e-1}$ is added before truncation instead of being subtracted). Then $A_x^k$ can be precisely estimated because $$\sum_{i=1}^{n} x_i a_i^k - \sum_{h=1}^{k} A_x^h p^{h,k} \in [0.0, p^{k+1}(1.0 + 2^{-e}) \in [0.0, p^k)$$

during encoding for signature checking and the truncated fraction of $A_x^k$ is bounded by $[0.0, (p^{k+1}(1.0+2^{-e})/p^k)$, which eliminates the need for the corrections by $\pm g^k$, for $k=1$ to $r-1$. Then the signature is valid if $y_j \equiv y_j' \bmod q_j$, for $j=1$ to $m'$.

If abbreviated signatures are desired, then $p^k < p^{k+1}$ is selected for only one value of $k$ from the range $[1, r-1]$ but preferably not $k=r-1$ if $r>2$ because $p^{r-1}>q$ is necessary to counter Stern and Toffin's attack. All other values of $k$ satisfy $p^k > p^{k+1}(1+2^{-e})$. The resulting key-set is designed for specifically for signatures because secret messages can not be uniquely decoded with $r>2$. Then the verifier tests if there is some $d$ congruent modulo $q$ to a value in the range $[-1, [p^{k'+1}/p^{k'}]+1]$ such that $y \equiv y' + dg^{k'} \bmod q$, where $k'$ corresponds to the one value of k with $p^k < p^{k+1}$ and d is calculated by $d \equiv (g^k)^{-1}(y'-y) \mod q$.

With r-iterations of modular multiplication, $g_j^k$, for $k = 1$ to $r - 1$ and $j = 1$ to m, can be standardized as well as $\{q_1, q_2, \ldots, q_{m'}\}$ and one weight $\{a_{v1}, a_{v2}, \ldots, a_{vm}\}$, where v is one of the integer values in the range [1, n]. The standardized values of $a_{vj}$ and $g_j^k$, for $k = 1$ to $r - 1$ and $j = 1$ to m, are randomly selected (or chosen with certain bit patterns) from the range [0, $q_j$). First, $\{b_1, b_2, \ldots, b_n\}$, $\{p^1, p^2, \ldots, p^r\}$, and $\{q_{m'+1}, q_{m'+2}, \ldots, q_m\}$ are chosen secretly (as they would be without partial standardization of the public key) and are not standardized. Then $\{w^1, w^2, \ldots, w^r\}$ are found sequentially according to the relation $$w^k \equiv (p^{k-1})^{-1} p^{k-1,k} \mod p^k,$$

for $k = r$ decrementing to 2, where $p^{k-1,k}$ is obtained by sequentially calculating $p^{k-1,r-1} \equiv (w^r)^{-1} p^{k-1,r} \mod p^r$, $p^{k-1,r-2} \equiv (w^{r-1})^{-1} p^{k-1,r-1} \mod p^{r-1}$, ..., $p^{k-1,k} \equiv (w^{k+1})^{-1} p^{k-1,k+1} \mod p^{k+1}$, where $p^{k-1,r} = g^{k-1}$ and $g^k \equiv \{g_1^k, g_2^k, \ldots, g_m^k\} \mod \{q_1, q_2, \ldots, q_m\}$. Next, $w^1$ is found according to the relation $$w^1 \equiv (a_v^0)^{-1} a_v^1 \mod p^1,$$

where $a_v^0 = b_v$, v is one of the integer values in the range [1, n], and $a_v^1$ is obtained by sequentially calculating $a_v^{r-1} \equiv (w^r)^{-1} a_v^r \mod p^r$, $a_v^{r-2} \equiv (w^{r-1})^{-1} a_v^{r-1} \mod p^{r-1}$, ..., $a_v^1 \equiv (w^2)^{-1} a_v^2 \mod p^2$, where $a_v^r \equiv \{a_{v1}, a_{v2}, \ldots, a_{vm}\} \mod \{q_1, q_2, \ldots, q_m\}$. The rest of the public key, $a_{ij}$, for $i = 1$ to $v - 1$ and $i = v + 1$ to n, and fractions $f_i^k$ and $f^{h,k}$, for $i = 1$ to n, $j = 1$ to m, $k = 1$ to $r - 1$, and $h = 1$ to $k - 1$, are not standardized and can be generated from the private-key (according to the same equations used without partial standardization), which is now fully selected. If the initial weights $\{b_1, b_2, \ldots, b_n\}$ are superincreasing, then $v = n$ is the most secure because $a_v^0 = b_v$ is the largest and contains the most secret information.

In still further embodiments, the r modular multiplications can be unwound during decoding with a slightly modified form of the present encoder. There are at least $r = 2$ iterations of modular multiplication during decoding: $y^{k-1} \equiv y^k (w^k)^{-1} \mod p^k$, from $k = r$ decrementing to 1, where $y^r \equiv \{y_1, y_2, \ldots, y_m\} \mod \{q_1, q_2, \ldots, q_m\}$. As described above, these modular multiplications can be unwound sequentially with any modular multiplication technique. However, the present modified encoder performs all r iterations of modular multiplication (plus recombination of the ciphertext residues) in parallel with close to the same amount of computation as a single modular multiplication.

Henry proposed a modular multiplication method called "double-encryption" (see U.S. Pat. No. 4,399,323), which was designed for the now-broken single-iterated Merkle-Hellman knapsack-cryptosystem. Henry's technique performs a single modular multiplication by a constant, such as $b = w^{-1} y \mod P$, with some precomputation; then a superincreasing series with target value b is solved to recover the message. Henry's modular multiplier resembles a knapsack encryption, which explains the name "double-encryption". For decoding an r-iterated knapsack, there are r iterations of modular multiplication to unwind and Henry recommends applying his modular multiplier r times sequentially in "Fast decryption algorithm for the knapsack cryptographic system", The Bell System Technical Journal, vol. 60, 1981, pp. 767–773. Henry's modular multiplier can also be applied r-times *sequentially* to the present invention. However, the present modular multiplier described below performs r modular multiplications by a constant in *parallel* with close to the same amount of computation as one modular multiplication. The present r-iterated modular multiplier resembles encoding with the present encoder (i.e. a knapsack plus nonlinear terms) so we also use the name "double-encryption". A "^" symbol is used below to differentiate the double-encryption decoding-key from the encoding-key.

The ciphertext $\{y_1, y_2, \ldots, y_m\}$ is first mapped to $\{z_1, z_2, \ldots, z_{\hat{n}}\}$, where $z_i \in [0, 2^{\hat{s}})$, for $i = 1$ to $\hat{n}$, $\hat{s}$ is a positive integer, $$y_j \equiv \sum_{i=1}^{v_j} z_{i+u_{j-1}} 2^{\hat{s}(i-1)} \mod q_j,$$

$$v_j = \left\lceil \frac{\log_2 y_j}{\hat{s}} \right\rceil$$

and $$u_j = \sum_{i=1}^{j} v_i.$$

The value of $v_j$, for $j = 1$ to m, will vary with the size of the ciphertext residues $\{y_1, y_2, \ldots, y_m\}$. Unreduced ciphertext residues $\{y_{m'+1}, y_{m'+2}, \ldots, y_m\}$, corresponding to the secret moduli $\{q_{m'+1}, q_{m'+2}, \ldots, q_m\}$, may be reduced at the start of decoding to minimize $v_j$, for $j = m' + 1$ to m, and the size of the double-encryption-key. The amount of computation for double-encryption is minimized with $\hat{s} = 1$ but the memory for the double-encryption-key, $(n\hat{s})^2/\hat{s}$ bits, is minimized by increasing $\hat{s}$. Alternate mappings can be employed providing each term $z_i$, for $i = 1$ to $\hat{n}$, contains $\hat{s}$ consecutive digits from one of the ciphertext residues.

The r-iterations of modular multiplication are performed with a multiple-iterated knapsack with nonlinear terms to correct the overflow that occurs modulo $p^k$, for $k = 1$ to r, as with the present encoder. If all of the reductions modulo $p^k$ are not complete to [0, $p^k$) then a different answer is obtained. In the case of secret messages, the encoder follows the large-sum principle so reduction modulo $p^k$ has to be complete during decoding and this is possible with double-encryption as described below. Complete reduction is not essential for signatures because the verifier can correct for a deviation by a multiple of $p^k$ with $g^k$. Overflow does not occur during decoding if the small-sum principle $p^k > \hat{n} 2^{\hat{s}} p^{k+1}$ is satisfied by the double-encryption weights. Consequently, overflow estimates are necessary for decoding secret messages by double-encryption because $p^{k+1} > p^k (1 + 2^{-e})$ but in a signature-only mode, overflow estimates are not needed modulo $p^k$ if $p^k > \hat{n} 2^{\hat{s}} p^{k+1}$, where $k \in [1, r-1]$.

In the exemplary case of $r = 2$, double-encryption involves calculating b according to the relations $$b \equiv \sum_{i=1}^{\hat{n}} z_i \hat{a}_i - A_z \hat{g} \mod P$$

and $$A_z = \left\lfloor 2^{-\hat{e}-1} + \sum_{i=1}^{\hat{n}} z_i \hat{f}_i \right\rfloor,$$

-continued where $$\hat{a}_i = |w^{-1}|w'^{-1}\hat{b}_i|_Q|_P$$

$$\hat{g} = w^{-1}Q \bmod P,$$

and $$\hat{f}_i = \frac{w'^{-1}\hat{b}_i \bmod Q}{Q}.$$

The initial-weights for double-encryption $\{\hat{b}_1, \hat{b}_2, \ldots, \hat{b}_{\hat{n}}\}$ are formed with the Chinese remainder theorem in the ring of integers modulo Q according to the relation $$\hat{b}_i = Q_j |2^{\hat{s}(i-d_j-1-1)}Q_j^{-1}|_{q_j},$$

where $Q_j = Q/q_j$ and $u_{j-1} \leq i \leq u_j$. After double-encryption to find b, the deciphered message $\{x'_1, x'_2, \ldots, x'_n\}$ is returned by solving a superincreasing series with target b and initial weights $\{b_1, b_2, \ldots, b_n\}$.

To ensure correct deciphering of encoded messages, the reduction modulo Q during decoding has to be completely correct (i.e. a deviation by a multiple of Q will cause an error). Consequently, the estimation of $A_z$ has to be exact during double-encryption so that $$\sum_{i=1}^{\hat{n}} z_i |w'^{-1}\hat{b}_i|_Q - A_z Q \in [0, Q).$$

During encoding, the error in the estimate of $A_x$ is bounded by $[-2^{-e-1}, 2^{-e-1})$ (before truncation) and the large-sum principle is satisfied because $$\sum_{i=1}^{n} x_i |wb_i|_P -$$

$$A_x P \in [0, P(1 + 2^{-e})) \in [0, Q), \text{ where } Q > P(1 + 2^{-e}).$$

If the error in the estimate of $A_z$ (before truncation) is bounded by $[-2^{-\hat{e}-1}, 2^{-\hat{e}-1})$, then $$\sum_{i=1}^{\hat{n}} z_i |w'^{-1}\hat{b}_i|_Q - A_z Q \in [0, P(1 + 2^{-e}) + Q2^{-\hat{e}}) \in [0, Q)$$

so $A_z$ is exact, where $Q(1-2^{-\hat{e}}) > P(1+2^{-e})$ and $2^{-\hat{e}-1}$ is added to $A_z$ (before truncation). Then the necessary precision of the double-encryption fractions $\hat{f}_i$ for decoding secret messages is $\hat{s} + \log_2 \hat{n} + \hat{e}$ bits.

Figure 9:
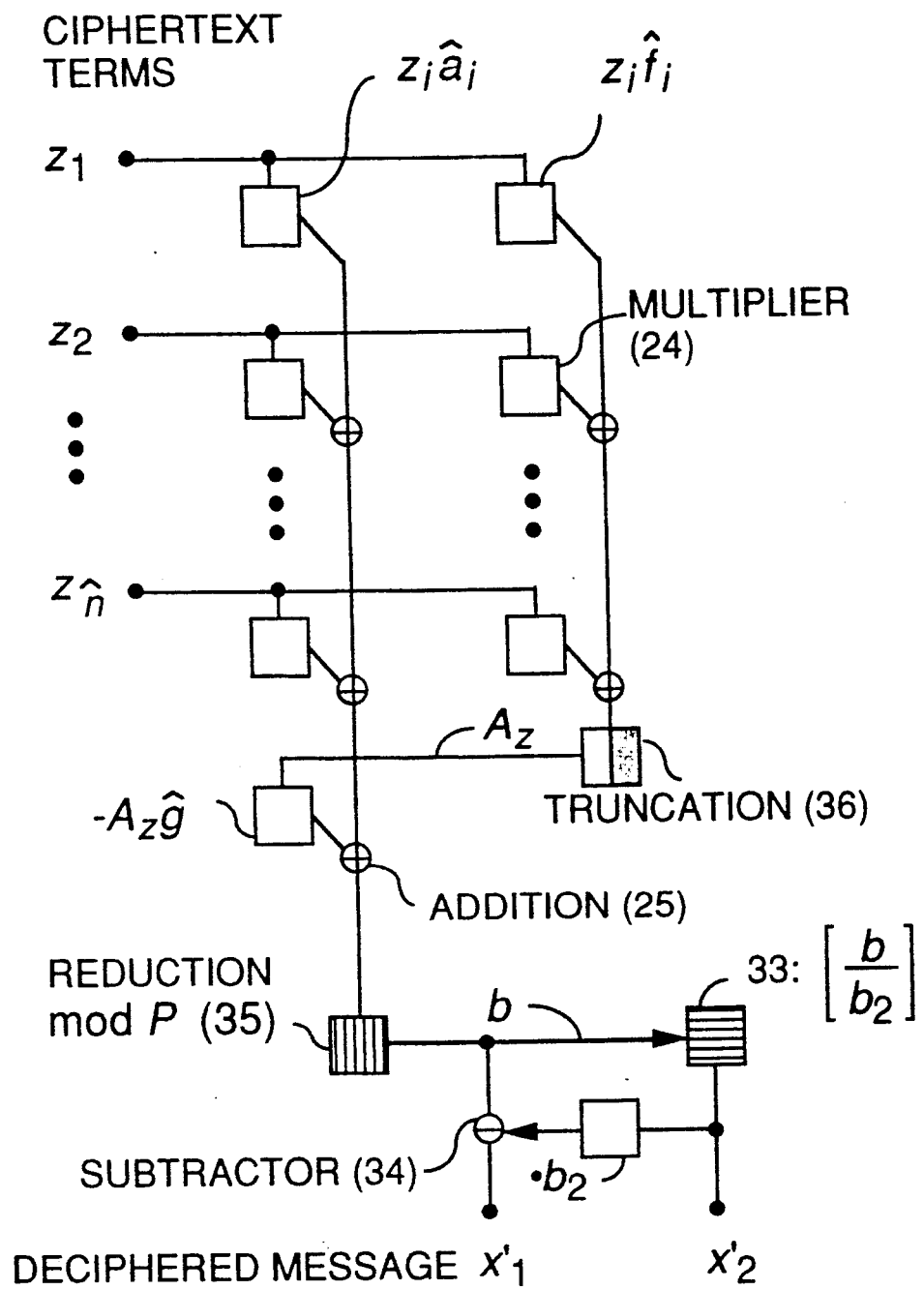
FIG. 9 shows in detailed block diagram form, an alternate decoding device for the system of FIG. 2.

A decoder with double-encryption and r=2 is illustrated in FIG. 9. The ciphertext is first assigned to the terms $\{z_1, z_2, \ldots, z_{\hat{n}}\}$ (i.e. $z_1$ is the first $\hat{s}$ bits of $y_1$, $z_2$ is the next $\hat{s}$ bits of $y_1$, and so on). Then the left column in FIG. 9 calculates $z_i \hat{a}_i$, for i=1 to $\hat{n}$, with multipliers 24, which is accumulated with adders 25. The right column calculates $z_i \hat{f}_i$, for i=1 to $\hat{n}$, with multipliers 24, which is accumulated separately with adders 25. The products $z_i \hat{f}_i$, for i=1 to $\hat{n}$, have to be precise to $\hat{e} + \log \hat{n}$ fractional bits. Then truncation subsystem 36 adds $2^{-\hat{e}-1}$ to the sum of the right column and outputs the integer part of the total as $A_z$. Next, $-A_z \hat{g}$ is calculated with a multiplier 24 and accumulated with the accumulation tree of the left column. The final total of the left column is then reduced modulo P and the remainder is b. A superincreasing series is solved with target value b and superincreasing weights $\{b_1, b_2, \ldots, b_n\}$. In the exemplary case of n=2 and $b_1 = 1$ as shown in FIG. 9, divider 33 calculates $x'_2 = [b/b_2]$ and then $x'_1 = b - [b/b_2]$ is found with subtracter 34. If $\hat{s} = 1$, the multipliers may be replaced by transmission gates that pass $\hat{a}_i$ and $\hat{f}_i$ if $z_i = 1$ and pass zero if $z_i = 0$.

Double-encryption can also be used for signature generation, in which case $A_z$ does not have to be exact but a correction by $\pm g$ will be needed during signature checking if $A_z$ has a deviation of one from the exact value. Then Q may be less than P for signatures with double-encryption. The minimum fraction size is $\hat{s} + \log_2 \hat{n}$ bits to keep the deviation to a single multiple of g because the small sum principle for double-encryption can never be satisfied modulo the final ring Q even for signatures. If w' is unwound before recombining $\{y_1, y_2, \ldots, y_m\}$ with mixed-radix conversion prior to double-encryption, then the $\pm g$ correction is not necessary but more computation is involved. In general, $$\sum_{i=1}^{\hat{n}} z_i |w'^{-1}\hat{b}_i|_Q - A_z Q$$

can have any value in $[0, Q)$ for signatures so $A_z$ can not be estimated exactly with a practically small value of $\hat{e}$ so a correction of $\pm g$ will be needed (this is also the case for signatures with r>2). In practice, a correction by $\pm g$ does not slow down signature checking or weaken the security so extra computational effort to avoid a correction of $\pm g$ is not recommended.

With r iterations of modular multiplication, double-encryption is performed according to the relations $$b \equiv \sum_{i=1}^{\hat{n}} z_i \hat{a}_i - \sum_{k=1}^{r-1} A_z^k \hat{g}^k \bmod c^r$$

and $$A_z^k = \left[ 2^{-\hat{e}-1} + \sum_{i=1}^{n} z_i \hat{f}_i^k - \sum_{h=1}^{k-1} A_z^h \hat{p}^{h,k} \right],$$

where $$\{c^r, c^{r-1}, \ldots, c^1\} = \{p^1, p^2, \ldots, p^r\},$$
$$\hat{a}_i^k \equiv (w^k)^{-1} \hat{a}_i^{k-1} \bmod c^k,$$

$$\hat{f}_i^k = \frac{\hat{a}_i^k}{c^k},$$

$$\hat{p}^{h,k} = \frac{c^{h,k}}{c^k},$$

$$\hat{g}^k = c^{k,r},$$

$P = c^r$, $Q = c^1$, $\hat{a}_i = \hat{a}_i^r$, $\hat{b}_i = \hat{a}_i^0$, and $c^{h,k}$ is obtained by calculating $c^{h,h+1} \equiv (w^{h+1})^{-1} c^h \bmod c^{h+1}$, $c^{h,h+2} \equiv (w^{h+2}|)^{-1} c^{h,h+1} \bmod c^{h+2}, \ldots, c^{h,k} \equiv (w^k)^{-1} c^{h,k-1} \bmod c^k$ ($c^{k,r}$ is calculated similarly).

Secret messages require $p^k(1-2^{-\hat{e}}) > p^{k-1}(1+2^{-e})$, for k=2 to r, to permit correct decoding with double-encryption, where $A_z^k$ is accurate to $2^{-\hat{e}}$ and the fractions $\hat{f}_i^k$ and $\hat{p}^{h,k}$, for i=1 to n, k=1 to r−1, and h=1 to k−1, need $\hat{s} + \log_2(n+k-1) + e$ bits precision. Signatures do not require $p^{k+1} > p^k$ for double-encryption and the required precision of the fractions is $\hat{s} + \log_2(\hat{n}+k-1) - \log_2[p^k/p^{k+1}]$ bits for k ∈ [2, r−1] and $\hat{s} + \log_2(\hat{n}+k-1)$ bits for k=r.

In still other embodiments, the number of nonlinear terms employed per iteration of modular multiplication can be increased to some positive integer $m^k$, where $$p^k = \prod_{j=1}^{m^k} p_j^k, p^{k+1} = \prod_{j=1}^{m^k} p_j^{k+1},$$

$k \in [1, r-1]$, $r>2$, $n>2$ ($n>1$ for signatures-only), $m^{r-1}=1$, and $p_j^{k+1}>p_j^k(1+2^{-e})$. The encoding function is generally defined as $$y_j = \sum_{i=1}^{n} x_i a_{ij} - \sum_{k=1}^{r-1} \sum_{l=1}^{m^k} A_l^k g_{lj}^k \mod q_j, \text{ for } j = 1 \text{ to } m',$$

$$y_j = \sum_{i=1}^{n} x_i a_{ij} - \sum_{k=1}^{r-1} \sum_{l=1}^{m^k} A_l^k g_{lj}^k, \text{ for } j = m' + 1 \text{ to } m, \text{ and}$$

$$A_i^k = \left[ -2^{-e-1} + \sum_{i=1}^{n} x_i f_{il}^k - \sum_{h=1}^{k-1} \sum_{j=1}^{m^h} A_j^h f_{j,l}^{h,k} \right],$$

where $f_{il}^k = \dfrac{a_i^k \mod p_l^k}{p_l^k}$, $a_i^{k+1} \equiv a_{ij}^{k+1} \mod p_j^{k+1} \equiv w^{k+1}(a_i^k \mod p_j^k) \mod p_j^{k+1}$, for $j = 1$ to $m^k$, $$f_{j,l}^{h,k} = \frac{p_{j,l}^{h,k}}{p_l^k},$$

$$g_{lj}^k = p_l^{k,r} \mod q_j = p_{l,j}^{k,r},$$

and $p_{j,l}^{h,k}$ is obtained by winding $p_j^h$ to modulus $p_l^k$ along the same path (with the same modular multiplications) taken by $a_{ij}^h$ ($p_{j,l}^{h,k}$ is zero for $j \neq l$ unless $p_l^k$ is subsequent to the rejoining of the $p_j^h$ branch). Decoding unwinds the modular multiplications, retracing the path (or paths of the residues) followed during encoding, where $y_j^k \equiv (w^{k+1})^{-1} y_j^{k+1} \mod p_j^{k+1}$, for $j=1$ to $m^k$, decrementing from $k=r-1$ to $0$ There can only be one nonlinear term to correct for overflow modulo $p^{r-1}$ (i.e. $m^{r-1}=1$) because of Stern and Toffin's attack. In general, $p^{k+1}$ has to have a minimum of $m^k$ moduli, but that does not necessarily mean that $m^{k+1}=m^k$ because $a_{ij}^{k+1} \mod p_j^{k+1}$, for $j=1$ to $m^{k+1}$, can be recombined with the Chinese remainder theorem or reduced to further sub-moduli (the product of the sub-moduli equals the parent modulus). All of $g_l^k$, for $k=1$ to $r-1$ and $l=1$ to $m^k$, can be standardized. Double-encryption can be used for decoding and there are $m^k$ nonlinear terms per ring $p^k$ during decoding as employed during encoding. The difficulty of the encoding problem is conjectured to increase with the number of nonlinear terms. However, the amount of computation and public-key size increases proportionately.

In yet further embodiments, the message can be encrypted with other cryptosystems or any series of invertable operations prior to or after encoding with the present invention.

Similarly, the following variations on the use of the encoding/decoding devices are to be considered as obvious to one skilled in the prior art and therefore within the intended scope of the attached claims:

(1) using the encoding/decoding devices in cipher-feedback mode or message-chaining mode instead of the simple block encoding method described here, or as a pseudo-random number generator to generate pads.

(2) signatures may be effected by signing a transformed version of the message, where the transformation is publicly known and is not necessarily invertable.

(3) using the present invention to transmit keys to be used in another encryption method for encoding subsequent messages.

(4) sending or receiving signed and/or secret messages by any combination of parties in a communications network, where each party has their own private decoding-key and mathematically related public encoding-key.

(5) compressing messages before encoding so as to minimize storage area and increase security by reducing the redundancy in the message.

(6) sending a secret signed message by encoding the message first with the public encoding-key of the sender and then decoding the encoded message with the private decoding-key of the sender, or decoding first and then encoding, and a receiver undoes the encoding/decoding transformations in the opposite order that they were applied.

Key-management protocols may be employed to distribute the public encoding-keys of all parties in a network to all other parties in the network and permit the detection of tampering in the distribution of the public encoding-keys. The following key-management protocols are established in the prior art and may be employed to distribute a public encoding-key belonging to a party A to a second party B with the present invention:

(7) the public-key of party A along with identification data is signed by a trusted key-management center and stored by party A and transmitted to party B, (8) party B obtains the public-encoding key of party A from a list of identities and corresponding public keys, which may be signed by a trusted key-management center, and (9) the public-key of party A is transmitted to party B along with the message and party B checks a compressed public-key of party A against a similarly compressed list of public-keys, which may have been signed by a trusted key-management center.

Other protocols that are designed for public-key cryptosystems may readily be employed with the present invention (see, for example, R. C. Merkle, "Protocols for public key cryptosystems", Proceedings of the 1980 IEEE Symposium on Security and Privacy, IEEE Computer Society, 1980 and S. Improta, "Privacy and authentication in ISDN: The key distribution problem", Proceedings of International Switching Symposium, 1984).

The present invention may be employed as a component of a communication and/or identification system such as a chip card, chip card reader, telephone, communications switch, personal security module, automated teller, point-of-service banking system, electronic funds transfer system, electronic cash system, dog tag, friend or foe system, inventory controller, lottery machine, access controller, or computer.

The present public-key cryptosystem is well suited to applications involving chip cards for identity checks and the exchange of signed and/or secret information because of the small amount of computation of the present invention compared to the prior art. As well, the present public-key cryptosystem has a modest key and signature size. The chip card acts as a terminal that communicates with another terminal such as an automated teller, telephone, computer, card reader, or access control device. A microprocessor on the chip card acts as the encoding and/or decoding device.

I claim:

1. A cryptographic communication system comprising:

A. a communications channel;
   B. an encoder coupled to the channel and adapted for transforming a message $\{x_1, x_2, \ldots, x_n\}$ to a ciphertext $\{y_1, y_2, \ldots, y_m\}$ on the channel, where $\{x_1, x_2, \ldots, x_n\}$ corresponds to a set of integers representative of the message and $$x_i \in [0, 2^s),$$

for $i = 1$ to $n$, where $n \geq 2$ and $s$ is some positive integer, and where $\{y_1, y_2, \ldots, y_m\}$ corresponds to a set of integers representative of an enciphered form of the message and corresponds to $$y_j = \sum_{i=1}^{n} x_i a_{ij} - \sum_{k=1}^{r-1} \sum_{l=1}^{m^k} A_l^k g_{lj}^k \bmod q_j, \text{ for } j = 1, \text{ to } m',$$

$$y_j = \sum_{i=1}^{n} x_i a_{ij} - \sum_{k=1}^{r-1} \sum_{l=1}^{m^k} A_l^k g_{lj}^k \text{ for } j = m'+1 \text{ to } m,$$

and $$A_l^k = \left[ -2^{-e-1} + \sum_{i=1}^{n} x_i f_{il}^k - \sum_{h=1}^{k-1} \sum_{j=1}^{m^h} A_j^h f_{j,l}^{h,k} \right],$$

where $1 \leq m' < m$ and $r \geq 2$, and where an encoding key contains the integers $a_{ij}$, $g_{lj}^k$, and fractions $f_{il}^k$ and $f_{j,l}^{h,k}$, for $i = 1$ to $n$, $j = 1$ to $m$, $l = 1$ to $m^k$, $k = 1$ to $r-1$, and $h = 1$ to $k-1$, and $q_j$, for $j = 1$ to $m'$, wherein $$a_{ij} \equiv a_i^r \bmod q_j,$$

where $a_i^r$ is obtained by performing $r$ iterations of modular multiplication according to the relation $$a_i^{k+1} \equiv a_i^{k+1} \bmod p_j^{k+1} \equiv w^{k+1}(a_i^k \bmod p_j^k) \bmod p_j^{k+1},$$

for $j = 1$ to $m^k$ and $k = 1$ to $r$, where $a_i^0 = b_i$, for $i = 1$ to $n$, and $$f_{il}^k = \frac{a_i^k \bmod p_l^k}{p_l^k},$$

$$f_{j,l}^{h,k} = \frac{p_{j,l}^{h,k}}{p_l^k}, \text{ and}$$

$$g_{lj}^k = p_l^{k,r} \bmod q_j = p_{l,j}^{k,r}, \text{ and}$$

where $p_{j,l}^{h,k}$ is obtained by modular multiplying $p_j^h$ to modulus $p_l^k$ according to the same relations followed by $a_{ij}^h$, and where a set of initial knapsack weights $\{b_1, b_2, \ldots, b_n\} = \{a_1^0, a_2^0, \ldots, a_n^0\}$ is selected as a superincreasing series according to the relation $$b_j > \sum_{i=1}^{j-1} b_i (2^s - 1)$$

and where $$p^k = \prod_{j=1}^{m^k} p_j^k,$$

where $k \in [1, r-1]$, and where $m^{r-1} = 1$ and $m^r = m$, and where $$p^1 > \sum_{i=1}^{n} b_i (2^s - 1) \text{ and}$$

$$p_j^{k+1} > p_j^k (1 + 2^{-e}), \text{ where}$$

$$p^{k+1} = \prod_{j=1}^{m^k} p_j^{k+1},$$

and where $A_l^k$ has an approximation error bounded by $[-2^{-e-1}, 2^{-e-1})$ before truncation, and where $\{q_1, q_2, \ldots, q_m\}$ are pairwise relatively prime and $$p^r = \prod_{j=1}^{m} q_j,$$

and, where $p^1$ is relatively prime to $b_i$, for $i = 1$ to $n$, and where $p^{k-1}$ and $p^k$ are relatively prime, for $k = 2$ to $r$, and where $w^k$ and $p^k$ are relatively prime, for $k = 1$ to $r$;

C. a decoder coupled to the channel and adapted for receiving the ciphertext $\{y_1, y_2, \ldots, y_m\}$ from the channel and for transforming $\{y_1, y_2, \ldots, y_m\}$ to a deciphered message $\{x'_1, x'_2, \ldots, x'_n\}$, wherein the deciphered message $\{x'_1, x'_2, \ldots, x'_n\}$ corresponds to a set of numbers representative of a deciphered form of the ciphertext $\{y_1, y_2, \ldots, y_m\}$, and where $\{y_1, y_2, \ldots, y_m\}$ is decoded by first calculating $$y_j^k \equiv (w^{k+1})^{-1} y_j^{k+1} \bmod p_j^{k+1},$$

for $j = 1$ to $m^k$ and decrementing from $k = r-1$ to $0$, where $y^r \equiv \{y_1, y_2, \ldots, y_m\} \bmod \{q_1, q_2, \ldots, q_m\}$, and then solving a knapsack problem, $$b = \sum_{i=1}^{n} x'_i b_i$$

with the set of initial knapsack weights $\{b_1, b_2, \ldots, b_n\}$ and target value $b = y^0$, by calculating sequentially $$x'_i = \left[ \frac{b - \sum_{j=i+1}^{n} x'_j b_j}{b_i} \right],$$

from $i = n$ decrementing to 1, to return the deciphered message $\{x'_1, x'_2, \ldots, x'_n\}$, and where a decoding key includes the positive integers $\{b_1, b_2, \ldots, b_n\}$, $\{w_1, w_2, \ldots, w_r\}$, $\{p^1, p^2, \ldots, p^r\}$, and $\{q_1, q_2, \ldots, q_m\}$.

2. A system as claimed in claim 1, wherein $m^k = 1$, for $k = 1$ to $r$, and where the cryptographic communication system under the limitation of $m^k = 1$, for $k = 1$ to $r$, comprises:

A. the communications channel;
B. the encoder, where the message $\{x_1, x_2, \ldots, x_n\}$ is encoded according to the relations $$y_j = \sum_{i=1}^{n} x_i a_{ij} - \sum_{k=1}^{r-1} A_x^k g_j^k \bmod q_j, \text{ for } j = 1 \text{ to } m',$$

$$y_j = \sum_{i=1}^{n} x_i a_{ij} - \sum_{k=1}^{r-1} A_x^k g_j^k, \text{ for } j = m' + 1 \text{ to } m, \text{ and}$$

$$A_x^k = \left[ -2^{-e-1} + \sum_{i=1}^{n} x_i f_i^k - \sum_{h=1}^{k-1} A_x^h f^{h,k} \right],$$

where $x_i \in [0, 2^s)$, for $i=1$ to $n$, where $n \geq 2$ and $s$ is some positive integer, and where $1 \leq m' < m$ and $r \geq 2$, and where the encoding key contains the integers $a_{ij}$, $g_j^k$, and fractions $f_i^k$ and $f^{h,k}$, for $i=1$ to $n$, $j=1$ to $m$, $k=1$ to $r-1$, and $h=1$ to $k-1$, and $q_j$, for $j=1$ to $m'$, wherein $$a_{ij} \equiv a_i^r \bmod q_j,$$

where $a_i^r$ is obtained by performing $r$ iterations of modular multiplication according to the relation $$a_i^k \equiv w^k a_i^{k-1} \bmod p^k,$$

from $k=1$ to $r$, where $a_i^0 = b_i$, for $i=1$ to $n$, and $$f_i^k = \frac{a_i^k}{p^k},$$

$$f^{h,k} = \frac{p^{h,k}}{p^k},$$

where $p^{h,k}$ is obtained by calculating $p^{h,h+1} \equiv w^{h+1} p^h \bmod p^{h+1}$, $p^{h,h+2} \equiv w^{h+2} p^{h,h+1} \bmod p^{h+2}, \ldots, p^{h,k} \equiv w^k p^{h,k-1} \bmod p^k$, and $$g_j^k \equiv p^{k,r} \bmod q_j,$$

and where the set of initial knapsack weights $\{b_1, b_2, \ldots, b_n\} = \{a_1^0, a_2^0, \ldots, a_n^0\}$ is selected as the superincreasing series according to the relations $$b_j > \sum_{i=1}^{j-1} b_i(2^s - 1),$$

$$p^1 > \sum_{i=1}^{n} b_i(2^s - 1), \text{ and}$$

$$p^k > (1 + 2^{-e}) p^{k-1}, \text{ for } k = 2 \text{ to } r,$$

where $A_x^k$ has an approximation error bounded by $[-2^{-e-1}, 2^{-e-1})$ before truncation and the fractions $f_i^k$ and $f^{h,k}$, for $i=1$ to $n$, $k=1$ to $r-1$, and $h=1$ to $k-1$, are published to $s + \log_2(n) + k - 1 + e$ bits precision, where $e$ is a positive number, and where $\{q_1, q_2, \ldots, q_m\}$ are pairwise relatively prime and $$p^r = \prod_{j=1}^{m} q_j,$$

and, where $p^1$ is relatively prime to $b_i$, for $i=1$ to $n$, and where $p^{k-1}$ and $p^k$ are relatively prime, for $k=2$ to $r$, and where $w^k$ and $p^k$ are relatively prime, for $k=1$ to $r$;
C. the decoder where the ciphertext $\{y_1, y_2, \ldots, y_m\}$ is decoded by first calculating $$y^{k-1} \equiv y^k (w^k)^{-1} \bmod p^k,$$

from $k=r$ decrementing to 1, where $y^r \equiv \{y_1, y_2, \ldots, y_m\} \bmod \{q_1, q_2, \ldots, q_m\}$, and then solving the knapsack problem, $$b = \sum_{i=1}^{n} x_i' b_i$$

with the set of initial knapsack weights $\{b_1, b_2, \ldots, b_n\}$ and target value $b = y^0$, by calculating sequentially $$x_i' = \left[ \frac{b - \sum_{j=i+1}^{n} x_j' b_j}{b_i} \right],$$

from $i=n$ decrementing to 1, to return the deciphered message $\{x_1', x_2', \ldots, x_n'\}$, and where the decoding key includes the positive integers $\{b_1, b_2, \ldots, b_n\}$, $\{w_1, w_2, \ldots, w_r\}$, $\{p^1, p^2, \ldots, p^r\}$, and $\{q_1, q_2, \ldots, q_m\}$.

3. A system as claimed in claim 1, wherein $r=2$ and $m^k=1$, for $k=1$ to $r$, and where the cryptographic communication system under the limitations of $m^k=1$, for $k=1$ or $r$, and $r=2$ comprises:
A. the communications channel;
B. the encoder, where the message $\{x_1, x_2, \ldots, x_n\}$ is encoded according to the relations $$y_j = \sum_{i=1}^{n} x_i a_{ij} - A_x g_j \bmod q_j, \text{ for } j = 1 \text{ to } m',$$

$$y_j = \sum_{i=1}^{n} x_i a_{ij} - A_x g_j, \text{ for } j = m' + 1 \text{ to } m, \text{ and}$$

$$A_x = \left[ -2^{-e-1} + \sum_{i=1}^{n} x_i f_i \right],$$

where $x_i \in [0, 2^s)$, for $i=1$ to $n$, where $n \geq 2$ and $s$ is some positive integer, and where $m \geq 2$ and $1 \leq m' < m$, and where the encoding key consists of integers $a_{ij}$, $g_j$, and fractions $f_i \in [0.0, 1.0)$, for $i=1$ to $n$ and $j=1$ to $m$, and $q_j$, for $j=1$ to $m'$, wherein $$a_{ij} \equiv |w'|wb_i|P|_{q_j},$$

$$g_i \equiv w'P \bmod q_j,$$

$$f_i = \frac{wb_i \bmod P}{P},$$

where with the present notation: $P = p^1$, $Q = p^2$, $w = w^1$, $w' = w^2$, and $|c|_d$ is equivalent to $c \bmod d$, and where the set of initial knapsack weights $\{b_1, b_2, \ldots, b_n\}$ is the superincreasing series with $$b_j > \sum_{i=1}^{j-1} b_i(2^s - 1) \text{ and}$$

-continued $$P > \sum_{i=1}^{n} b_i(2^s - 1),$$

and where $\{q_1, q_2, \ldots, q_m\}$ are chosen such that $$Q = \prod_{j=1}^{m} q_j > P(1 + 2^{-e}),$$

where $A_x$ has an approximation error bounded by $[-2^{-e-1}, 2^{-e-1})$ before truncation and the fractions $f_i$, for $i=1$ to n, are published to $s+\log_2 n + e$ bits precision, where e is a positive number, and where P is relatively prime to $b_i$, for $i=1$ to n, and where $\{q_1, q_2, \ldots, q_m\}$ are pairwise relatively prime, and where P and Q are relatively prime, and where w and P are relatively prime, and where w' and Q are relatively prime, and C. the decoder, where the ciphertext $\{y_1, y_2, \ldots, y_m\}$ is decoded by first calculating $$b = |w^{-1}|w'^{-1}y|_Q|_P$$

where $y \equiv \{y_1, y_2, \ldots, y_m\}$ mod $\{q_1, q_2, \ldots, q_m\}$, and and then solving the knapsack problem $$b = \sum_{i=1}^{n} x_i' b_i$$

with the set of initial knapsack weights $\{b_1, b_2, \ldots, b_n\}$ by calculating $$x_i' = \left\lfloor \frac{b - \sum_{j=i+1}^{n} x_j' b_j}{b_i} \right\rfloor,$$

from $i=n$ decrementing to 1, to return the deciphered message $\{x'_1, x'_2, \ldots, x'_n\}$, and where the decoding key is the positive integers w, w', $\{q_1, q_2, \ldots, q_m\}$, $\{b_1, b_2, \ldots, b_n\}$, and P.

4. The system of claim 1 and further comprising an alternate initial knapsack construction, wherein
the set of initial knapsack weights $\{b_1, b_2, \ldots, b_n\}$ is selected as a partially superincreasing series that contains n" non-superincreasing bands, where a superincreasing series $\{d_1, d_2, \ldots, d_{n'}\}$ is first selected according to the relations $$d_j > \sum_{i=1}^{j-1} d_i(2^{s_i} - 1) \text{ and}$$

$$P > \sum_{i=1}^{n'} d_i(2^{s_i} - 1),$$

$(P=p^1)$ and then $\{d_1, d_2, \ldots, d_{n'}\}$ is divided into two subsets S and S*, where S contains any n elements, S* contains the remaining n" elements, and $n'=n+n''$, and where the set of initial knapsack weights $\{b_1, b_2, \ldots, b_n\}$ is calculated $$b_i = d_j + \sum_{\substack{k \in S^* \\ \text{all } k}} r_{ik} d_k,$$

for $i=1$ to n, where $d_j \in S$, a different value of $d_j$ from subset S is used with each $b_i$, and $r_{ik}$ is randomly selected from $[0, 2^{s_i}/n)$, for all $k \in S^*$, and where the message is assigned to $x_i \in [0, 2^{s_i})$, for $i=1$ to n, and where the decoder decodes the ciphertext by solving the superincreasing series with weights $\{d_1, d_2, \ldots, d_{n'}\}$ and target value b and the deciphered message $\{x'_1, x'_2, \ldots, x'_n\}$ corresponds to the coefficients of the subset S of $\{d_1, d_2, \ldots, d_{n'}\}$.

5. The system of claim 1 and further comprising an alternate initial knapsack construction, wherein
$P = p^1$ is selected as a residue number system, where $$P = \prod_{i=1}^{n} p_i$$

and $\{p_1, p_2, \ldots, p_n\}$ are chosen randomly from an interval $p_i \in [2^d, 2^d+v)$, for $i=1$ to n, where d and v are positive integers, and where $\{p_1, p_2, \ldots, p_n\}$ are pairwise relatively prime, and where the set of initial knapsack weights $\{b_1, b_2, \ldots, b_n\}$ are generated by first selecting a matrix $$b = \begin{pmatrix} b_{11} & b_{12} & \cdots & b_{1n} \\ b_{21} & b_{22} & \cdots & b_{2n} \\ \cdot & \cdot & & \cdot \\ \cdot & \cdot & & \cdot \\ \cdot & \cdot & & \cdot \\ b_{n1} & b_{n2} & \cdots & b_{nn} \end{pmatrix},$$

where $b_{ij}$, for $i=1$ to n and $j=1$ to n, are randomly chosen from the range $b_{ij} \in [0, 2^z)$ such that the matrix b is nonsingular and invertable and the sum of each column of b is less than $2^z$, and where the set of initial knapsack weights $\{b_1, b_2, \ldots, b_n\}$ are defined by the relation $b_i \equiv \{b_{i1}, b_{i2}, \ldots, b_{in}\}$ mod $\{p_1, p_2, \ldots, p_n\}$ and the residues $\{b_{i1}, b_{i2}, \ldots, b_{in}\}$ can be recombined by the Chinese remainder theorem according to the relation $$b_i = \left| \sum_{j=1}^{n} b_{ij} P_j |P_j^{-1}|_{p_j} \right|_P$$

where $P_j = P/p_j$, and where the message $\{x_1, x_2, \ldots, x_n\}$ satisfies $x_i < 2^s$, for $i=1$ to n, and where $d \geq s+z$, and where $n \geq 2$ and $r \geq 2$, and where the decoder calculates $x''_i = y^0$ mod $p_i$, for $i=1$ to n, and then a matrix multiplication $x' = x'' \cdot b^{-1}$ is performed, where $x' = (x'_1, x'_2, \ldots, x'_n)$ and $x'' = (x''_1, x''_2, \ldots, x''_n)$, and where the deciphered message $\{x'_1, x'_2, \ldots, x'_n\}$ is congruent to the message $\{x_1, x_2, \ldots, x_n\}$ modulo $\{p_1, p_2, \ldots, p_n\}$.

6. The system of claim 5, wherein
the matrix b is selected as an identity matrix and $b_i = P_i(P_i^{-1} \text{ mod } p_i)$, for $i=1$ to n, where $P_j = P/p_j$ and $n \geq 2$.

7. The system of claim 5, wherein
the matrix b is selected with dimensions $n-1$ by $n-1$ and $b_{ij} \in [0, 2^s)$, for $i=1$ to $n-1$ and $j=1$ to $n-1$, and where $$P = \pi_{i=1}^{n-1} p_i,$$

$p_i \geq 2^d$, and $d \geq s+z$, and where $b_i \equiv \{b_{i1}, b_{i2}, \ldots, b_{in-1}\}$ mod $\{p_1, p_2, \ldots, p_{n-1}\}$, for $i=1$ to $n-1$, and $b_n = 1$, and where the message is assigned to $x_n \in [0, 2^s)$ and random bits are assigned to $x_i \in [0, 2^z)$, for $i=1$ to $n-1$ to $n-1$, and where the decoder calculates $x' = x'' \cdot b^{-1}$, where $x' = (x'_1, x'_2, \ldots, x'_{n-1})$ are rational numbers and then the deciphered message is $$x_n' = x_i'' - \sum_{j=1}^{n-1} ([x_i'] + u_j) b_{ij},$$

where $i$ is any integer from the range $[1, n-1)$ and $u_j = 0$ if the sum of the $i$th column of $b^{-1}$ is positive (i.e. if $$\sum_{j=1}^{n-1} b_{ij}^{-1} \geq 0)$$

and $u_j = 1$ otherwise.

8. The system of claim 1 and further comprising an alternate initial knapsack construction, wherein
the set of initial knapsack weights is $\{b_1, b_2\} = \{1, p_1 | p_1^{-1} | p_2\}$, and where the message is assigned to $\{x_1, x_2\}$, where $x_i \in [0, 2^s)$, and $x_2 > x_1$, and the encoder calculates the ciphertext corresponding to a message of $\{x_1, x_2-x_1\}$, and where $n=2$ and $r \geq 2$, and where the decoder calculates $x'_i = y^0$ mod $p_i$, for $i=1$ to $n$, and where the deciphered message $\{x'_1, x'_2\}$ is congruent to the original message $\{x_1, x_2\}$ modulo $\{p_1, p_2\}$.

9. The system of claim 2 and further comprising an alternate decoder with double-encryption, wherein
the alternate decoder first maps the ciphertext $\{y_1, y_2, \ldots, y_m\}$ to $\{z_1, z_2, \ldots, z_{\hat{n}}\}$, where $$y_j \equiv \sum_{i=1}^{v_j} z_{i+u_{j-1}} 2^{\hat{s}(i-1)} \mod q_j, \text{ where}$$

$$v_j = \left\lceil \frac{\log_2 y_j}{\hat{s}} \right\rceil,$$

$$u_j = \sum_{i=1}^{j} v_i,$$

$z_i \in [0, 2^{\hat{s}})$, for $i=1$ to $\hat{n}$, and $\hat{s}$ is a positive integer, and where $b$ is calculated according to the relations $$b \equiv \sum_{i=1}^{\hat{n}} z_i \hat{u}_i - \sum_{k=1}^{r-1} A_z^k \hat{g}^k \mod c^r \text{ and}$$

$$A_z^k = \left[ 2^{-\hat{e}-1} + \sum_{i=1}^{n} z_i \hat{f}_i^k - \sum_{h=1}^{k-1} A_z^h \hat{p}^{h,k} \right], \text{ where}$$

$\{c^r, c^{r-1}, \ldots, c^1\} = \{p^1, p^2, \ldots, p^r\}$, $u_i^k \equiv (w^k)^{-1} \hat{u}_i^{k-1} \mod c^k$, $$\hat{f}_i^k = \frac{\hat{u}_i^k}{c^k},$$

$$\hat{p}^{h,k} = \frac{c^{h,k}}{c^k}, \text{ and}$$

$$\hat{g}^k = c^{k,r},$$

and where $c^{h,k}$ is obtained by calculating
$c^{h,h+1} \equiv (w^{h+1})^{-1} c^h \mod c^{h+1}$,
$c^{h,h+2} \equiv (w^{h+2})^{-1} c^{h,h+1} \mod c^{h+2}, \ldots,$
$c^{h,k} \equiv (w^k)^{-1} c^{h,k-1} \mod c^k$, and where $\hat{a}_i = \hat{a}_i$ and $\hat{b}_i = \hat{a}_i^0$, and where $$\hat{b}_i = Q_j | 2^{\hat{s}(i-d_j-1)} Q_j^{-1} |_{q_j},$$

where $Q = p^r$, $Q_j = Q/q_j$, and $u_{j-1} < i \leq u_j$, and where the deciphered message $\{x'_1, x'_2, \ldots, x'_n\}$ is obtained by solving the knapsack problem $$b \equiv \sum_{i=1}^{n} x_i' b_i$$

with the set of initial knapsack weights $\{b_1, b_2, \ldots, b_n\}$, and where $p^k(1-2^{-\hat{e}}) > p^{k-1}(1+2^{-\hat{e}})$, for $k=2$ to $r$, and the fractions $\hat{f}_i^k$ and $\hat{f}^{h,k}$, for $i=1$ to $n$, $k=1$ to $r-1$, and $h=1$ to $k-1$, are precise to $\hat{s} + \log_2(\hat{n}+k-1) + \hat{e}$ bits.

10. A system as claimed in claim 9, wherein $r=2$, and where the alternate decoder under the limitation of $r=2$ calculates $b$ according to the relations $$b \equiv \sum_{i=1}^{\hat{n}} z_i \hat{a}_i - A_z \hat{g} \mod P \text{ and}$$

$$A_z = \left[ 2^{-\hat{e}-1} + \sum_{i=1}^{\hat{n}} z_i \hat{f}_i \right], \text{ where}$$

$\hat{a}_i \equiv |w^{-1}| w^{t-1} \hat{b}_i | Q | P$ $\hat{g} \equiv w^{-1} Q \mod P$, and $$\hat{f}_i = \frac{w^{t-1} b_i \mod Q}{Q}, \text{ and}$$

where with the present notation: $P = p^1$, $Q = p^2$, $w = w^1$, $w' = w^2$, and $|c|_d$ is equivalent to $c$ mod $d$, and where $Q(1-2^{-\hat{e}}) > P(1+2^{-\hat{e}})$ and the fractions $\hat{f}_i$, for $i=1$ to $\hat{n}$, are precise to $\hat{s} + \log_2 \hat{n} + \hat{e}$ bits.

11. The system of claim 1, wherein the encoder and the decoder comprises:
at least one of the group consisting of: microprocessor, parallel processor, computer, and integrated circuits, and at least one of the group consisting of: registers for storing inputs and outputs of the encoder and decoder and constants related to the key; adders, multipliers, modular multipliers, and modular reduction circuits; and write-only registers for storing the secret key, and where the encoder and the decoder are part of a cryptographic communication and/or identification system.

12. The system of claim 2 and further comprising a shortened encoding key, wherein
a subset of the variables in the encoding key are standardized during key-generation, where the standardized subset of the encoding key of each user in a network is identical, and where the encoding key as defined in claim 2 is $a_{ij}$, $g_j^k$, and fractions $f_i^k$ and $f^{h,k}$, for $i=1$ to $n$, $j=1$ to $m$, $k=1$ to $r-1$, and $h=1$ to $k-1$, and $q_j$, for $j=1$ to $m'$, and where $\{q_1, q_2, \ldots\}$ ..., $q_{m'}$} is standardized, and where one weight {$a_{v1}$, $a_{v2}$, ..., $a_{vm}$} is standardized, where v is one of the integer values in the range [1, n], and where $g_j^k$, for k=1 to r−1 and j=1 to m, are standardized, and where the standardized values of $a_{vj}$ and $g_j^k$, for k=1 to r−1 and j=1 to m, are randomly selected from the range [0, $q_j$), and where {$b_1$, $b_2$, ..., $b_n$}, {$p^1$, $p^2$, ..., $p^r$}, and {$q_{m'+1}$, $q_{m'+2}$, ..., $q_m$} are selected as specified in claim 2 and are not standardized, and where {$w^1$, $w^2$, ..., $w^r$} are next calculated sequentially according to the relation $$w^k \equiv (p^{k-1})^{-1} p^{k-1,k} \bmod p^k,$$

from k=r decrementing to 2, where $p^{k-1,k}$ is obtained by sequentially calculating $p^{k-1,r-1} \equiv (w^r)^{-1} p^{k-1,r} \bmod p^r$, $p^{k-1,r-2} \equiv (w^{r-1})^{-1} p^{k-1,r-1} \bmod p^{r-1}$, ..., $p^{k-1,k} \equiv (w^{k+1})^{-1} p^{k-1,k+1} \bmod p^{k+1}$, where $p^{k-1,r} = g^{k-1}$ and $g^k \equiv \{g_1^k, g_2^k, ..., g_m^k\} \bmod \{q_1, q_2, ..., q_m\}$, and where $w^1$ is found according to the relation $$w^1 \equiv (a_v^0)^{-1} a_v^1 \bmod p^1,$$

where $a_v^0 = b_v$ and $a_v^1$ is obtained by sequentially calculating $a_v^{r-1} \equiv (w^r)^{-1} a_v^r \bmod p^r$, $a_v^{r-2} \equiv (w^{r-1})^{-1} a_v^{r-1} \bmod p^{r-1}$, ..., $a_v^1 \equiv (w^2)^{-1} a_v^2 \bmod p^2$, where $a_v^r \equiv \{a_{v1}, a_{v2}, ..., a_{vm}\} \bmod \{q_1, q_2, ..., q_m\}$, and where the rest of the encoding key: $a_{ij}$, for i=1 to v−1 and i=v+1 to n, and fractions $f_i^k$ and $f^{h,k}$, for i=1 to n, j=1 to m, k=1 to r−1, and h=1 to k−1, is then selected as specified in claim 2 and is not standardized.

13. The system of claim 3 and further comprising a shortened encoding key, wherein a subset of the variables in the encoding key are standardized during key-generation, where the standardized subset of the encoding key of each user in a network is identical, and where the encoding key as defined in claim 3 is {$a_{i1}$, $a_{i2}$, ..., $a_{im}$}, for i=1 to n, {$g_1$, $g_2$, ..., $g_m$}, {$f_1$, $f_2$, ..., $f_n$}, and {$q_1$, $q_2$, ..., $q_{m'}$}, and where {$q_1$, $q_2$, ..., $q_{m'}$} is standardized, and where {$a_{n1}$, $a_{n2}$, ..., $a_{nm}$} and {$g_1$, $g_2$, ..., $g_m$} are standardized by randomly selecting $a_{nj}$ and $g_j$ from the range [0, $q_j$), for j=1 to m, and where P, {$b_1$, $b_2$, ..., $b_n$}, and {$q_{m'+1}$, $q_{m'+2}$, ..., $q_m$} are selected as specified in claim 3 and are not standardized, and where w' is found according to the relation $$w' \equiv P^{-1} g \bmod Q,$$

where $g \equiv \{g_1, g_2, ..., g_m\} \bmod \{q_1, q_2, ..., q_m\}$, and where w is found according to the relation $$w \equiv |b_n^{-1}|w'^{-1} a_n|Q|P$$

where $a_n \equiv \{a_{n1}, a_{n2}, ..., a_{nm}\} \bmod \{q_1, q_2, ..., q_m\}$, and where the rest of the encoding key: $a_{ij}$, for i=1 to n−1 and j=1 to m, and $f_i$, for i=1 to n, is not standardized and is then selected as specified in claim 3.

14. The system of claim 2 and further comprising a signature verification, wherein a sender generates a signature of the message with the decoder and the decoding key of the sender, where n≥1 and r≥2, and where the message is assigned to {$y_1$, $y_2$, ..., $y_{m'}$} by a blocking method, where $y_j \in [0, q_j)$ for j=1 to m', and 1≤m', and 1≤m'<m, and where at least one of the following group: secret random integers, secret pseudo-random integers, secret non-random integers, and non-secret integers that are constant for all signatures, are assigned to {$y_{m'+1}$, $y_{m'+2}$, ..., $y_m$}, where $y_j \in [0, q_j)$ for j=m'+1 to m, and where decoding {$y_1$, $y_2$, ..., $y_m$} with the decoder and the decoding key of the sender yields the signature {$x_1$, $x_2$, ..., $x_n$}, and where the sender then checks if $x_j < 2^s$, for j=1 to n, and if this test is failed, then decoding {$y_1$, $y_2$, ..., $y_m$} is repeated with a different value of {$y_{m'+1}$, $y_{m'+2}$, ..., $y_m$}, and where the signature and the message are sent to a receiver along the communications channel, and the signature {$x_1$, $x_2$, ..., $x_n$} is checked by the receiver or by a third party by encoding {$x_1$, $x_2$, ..., $x_n$} to {$y'_1$, $y'_2$, ..., $y'_{m'}$} with the encoder and the encoding key of the sender, and where the message is assigned to {$y_1$, $y_2$, ..., $y_{m'}$} with the blocking method, and where the signature is valid if $$y_j \equiv y'_j + \sum_{k=1}^{r-1} d^k g_j^k \bmod q_j,$$

for j=1 to m', where $d^k \in [-1, [p^{k+1}/p^k]+1]$.

15. The system of claim 2 and further comprising a signature verification, wherein a sender generates a signature of the message with the decoder and the decoding key of the sender by assigning the message to {$y_1$, $y_2$, ..., $y_{m'}$} with a blocking method, where $y_j \in [0, q_j)$ for j=1 to m', and where n≥1 and r≥2, and where an integer c is selected from one of the group consisting of: a secret random integer, a secret non-random integer, and a fixed public integer, and where $c \in [p^{r-1} 2^{-e}/q, p^{r-1}/q)$, where $$q = \prod_{j=1}^{m'} q_j,$$

and where $y^r \bmod q$ and c are combined according to the relation $$y^{r-1} \equiv |(w^r)^{-1} y^r| q + cq,$$

where $y^r \equiv \{y_1, y_2, ..., y_{m'}\} \bmod \{q_1, q_2, ..., q_{m'}\}$, and where $y^{r-1}$ is an intermediate value in the decoder and decoding is completed from $y^{r-1}$ by the decoder to generate the signature {$x_1$, $x_2$, ..., $x_n$}, and where decoding $y^{r-1}$ is repeated with a different value of c if $x_j \geq 2^s$, for j=1 to n, and where the signature and the message are sent to a receiver along the communications channel, and the signature {$x_1$, $x_2$, ..., $x_n$} is checked by the receiver or by a third party by encoding {$x_1$, $x_2$, ..., $x_n$} to {$y'_1$, $y'_2$, ..., $y'_{m'}$} with the encoder and the encoding key of the sender, and where the message is assigned to {$y_1$, $y_2$, ..., $y_{m'}$} with the blocking method, and where the signature is valid if $$y_j \equiv y'_j + \sum_{k=1}^{r-2} d^k g_j^k \bmod q_j,$$

for j=1 to m', where $d^k \in [-1, [p^{k+1}/p^k]+1]$.

16. A method as claimed in claim 15, wherein $m'=1$ and $r=2$.

17. The system of claim 2 and further comprising a signature verification, wherein a sender generates a signature of the message with the decoder and the decoding key of the sender, where $n \geq 1$ and $r \geq 2$, and where the message is assigned to $\{y_1, y_2, \ldots, y_{m'}\}$ by a blocking method, where $y_j \in [0 \; q_j)$ for $j=1$ to $m'$, and $1 \leq m' < m$, and where at least one of: secret random integers, secret pseudo-random integers, secret non-random integers, and non-secret integers that are constant for all signatures, are assigned to $\{y_{m'+1}, y_{m'+2}, \ldots, y_m\}$, where $y_j \in [0, \; q_j)$ for $j = m'+1$ to m, and where decoding $\{y_1, y_2, \ldots, y_m\}$ with the decoder and the decoding key of the sender yields the signature $\{x_1, x_2, \ldots, x_n\}$, where the decoding key is selected with $p^k > p^{k+1}(1+2^{-e})$, for $k=1$ to $r-1$, and where decoding $\}y_1, y_2, \ldots y_m\}$ is repeated with a different value of $\{y_{m'+1}, y_{m'+2}, \ldots, y_m\}$ if $x_j \geq 2^s$, for $j=1$ to n, and where the signature and the message are sent to a receiver along the communications channel, and the signature $\{x_1, x_2, \ldots, x_n\}$ is checked by the receiver or by a third party by encoding $\{x_1, x_2, \ldots, x_n\}$ to $\{y'_1, y'_2, \ldots, y'_{m'}\}$ with the encoder and the encoding key of the sender, where the encoder calculates $A_x^k$ during signature checking according to $$A_x^k = \left[ 2^{-e-1} + \sum_{i=1}^{n} x_i f_i^k - \sum_{h=1}^{k-1} A_x^h f^{h,k} \right],$$

and, where the message is assigned to $\{y_1, y_2, \ldots, y_{m'}\}$ with the blocking method, and where the signature is valid if $y_j \equiv y'_j \bmod q_j$, for $j=1$ to $m'$.

18. The system of claim 2 and further comprising an abbreviated signature, wherein a sender generates a signature of the message with the decoder using the decoding key of the sender, where $n \geq 1$ and $r \geq 2$, and where the message is assigned to $\{y_1, y_2, \ldots, y_{m'}\}$ by a blocking method, where $y_j \in [0, q_j)$ for $j=1$ to $m'$, and $1 \leq m' < m$, and where at least one of: secret random integers, secret pseudo-random integers, secret non-random integers, and non-secret integers that are constant for all signatures, are assigned to $\{y_{m'+1}, y_{m'+2}, \ldots, y_m\}$, where $y_j \in [0, q_j)$ for $j=m'+1$ to m, and where decoding $\{y_1, y_2, \ldots, y_m\}$ with the decoder and the decoding key of the sender yields the signature $\{x_1, x_2, \ldots, x_n\}$, where the decoding key is selected with $p^k > p^{k+1}(1+2^{-e})$, for $k=1$ to $k'-1$ and $k'+1$ to $r-1$, where $k'$ is one value from $[1, r-1]$, and where the signature is abbreviated by selecting $p^{k'} < p^{k'+1}$, and where decoding $\{y_1, y_2, \ldots, y_m\}$ is repeated with a different value of $\{y_{m'+1}, y_{m'+2}, \ldots, y_m\}$ if $x_j \geq 2^s$, for $j=1$ to n, and where the signature and the message are sent to a receiver along the communications channel, and the signature $\{x_1, x_2, \ldots, x_n\}$ is checked by the receiver or by a third party by encoding $\{x_1, x_2, \ldots, x_n\}$ to $\{y'_1, y'_2, \ldots, y'_{m'}\}$ with the encoder and the encoding key of the sender, where the encoder calculates $A_x^k$ during signature checking according to $$A_x^k = \left[ 2^{-e-1} + \sum_{i=1}^{n} x_i f_i^k - \sum_{h=1}^{k-1} A_x^h f^{h,k} \right],$$

and, where the message is assigned to $\{y_1, y_2, \ldots, y_{m'}\}$ with the blocking method, and where the signature is valid if $y \equiv y' + dg^{k'} \bmod q$ with $d \in [-1, [p^{k'+1}/p^{k'}]+1]$, where $d \equiv (g^{k'})^{-1}(y'-y) \bmod q$, $y \equiv \{y_1, y_2, \ldots, y_{m'}\} \bmod \{q_1, q_2, \ldots, q_{m'}\}$, $y' \equiv \{y'_1, y'_2, \ldots, y'_{m'}\} \bmod \{q_1, q_2, \ldots, q_{m'}\}$, and $$q = \prod_{j=1}^{m'} q_j.$$

19. The system of claim 14 and further comprising an identity verification, wherein a party (the verifier) wishes to verify a claimed identity of a second party (the candidate) and the verifier generates a secret random number and sends the secret random number to the candidate along the communications channel, and the candidate then generates the signature of the message, where the message is set equal to the secret random number, with the decoder and the decoding key of the candidate and sends the signature along the communications channel to the verifier, and the verifier then verifies if the signature of the secret random number is valid with the encoder and the encoding key of the candidate, and the claimed identity is true if the signature of the secret random number is valid.

20. The system of claim 1 and further comprising an identity verification, wherein a party (the verifier) wishes to verify a claimed identity of a second party (the candidate) and the verifier generates a secret random number and the message is set equal to the secret random number, and where the verifier assigns the message to $\{x_1, x_2, \ldots, x_n\}$, where $x_j \in [0, 2^s)$, for $j=1$ to n, and where the verifier encodes the message $\{x_1, x_2, \ldots, x_n\}$ to the ciphertext $\{y_1, y_2, \ldots, y_m\}$ with the encoder and the encoding key of the candidate and sends $\{y_1, y_2, \ldots, y_m\}$ to the candidate along the communications channel, and the candidate decodes $\{y_1, y_2, \ldots, y_m\}$ with the decoder and the decoding key of the candidate to obtain the deciphered message $\{x'_1, x'_2, \ldots, x'_n\}$ and the candidate sends $\{x''_1, x''_2, \ldots, x''_n\}$ to the verifier along the communications channel, where $x''_j \equiv x'_j \bmod 2^{s'}j$ and $s''_j \leq s$, for $j=1$ to n, and the verifier determines that the claimed identity of the candidate is true if $x''_j \equiv x_j \bmod 2^{s'}j$, for $j=1$ to n.

* * * * *